United States Patent
Hashimoto et al.

(10) Patent No.: US 6,500,551 B1
(45) Date of Patent: Dec. 31, 2002

(54) MAGNETIC RECORDING MEDIUM

(75) Inventors: Hiroshi Hashimoto, Odawara (JP); Yuichiro Murayama, Odawara (JP); Katsuhiko Meguro, Odawara (JP)

(73) Assignee: Fuji Photo Film Co., LTD, Kanagawa (JP)

(*) Notice: Subject to any disclaimer, the term of this patent is extended or adjusted under 35 U.S.C. 154(b) by 0 days.

(21) Appl. No.: 09/509,024

(22) PCT Filed: Jul. 16, 1999

(86) PCT No.: PCT/JP99/03842
§ 371 (c)(1),
(2), (4) Date: Mar. 21, 2000

(87) PCT Pub. No.: WO00/05714
PCT Pub. Date: Feb. 3, 2000

(30) Foreign Application Priority Data

| Jul. 21, 1998 | (JP) | 10-205338 |
| Dec. 24, 1998 | (JP) | 10-366885 |
| Dec. 24, 1998 | (JP) | 10-366886 |
| Dec. 24, 1998 | (JP) | 10-366887 |

(51) Int. Cl.$^7$ .............................................. G11B 5/702
(52) U.S. Cl. .............................. 428/425.9; 428/694 BU; 428/694 BL; 428/900
(58) Field of Search ...................... 428/425.9, 694 BU, 428/694 BL, 900

(56) References Cited

U.S. PATENT DOCUMENTS

| 5,795,645 | A | * | 8/1998 | Takahashi et al. | 428/216 |
| 5,972,515 | A | * | 10/1999 | Murayama et al. | 428/425.9 |
| 6,025,456 | A | * | 2/2000 | Wünsch et al. | 528/79 |
| 6,114,057 | A | * | 9/2000 | Kato | 428/694.13 |
| 6,224,967 | B1 | * | 5/2001 | Murayama et al. | 428/216 |

FOREIGN PATENT DOCUMENTS

| JP | 1-223623 | 9/1989 |
| JP | 2-276811 | 11/1990 |
| JP | 8-167137 | 6/1996 |
| JP | 10-320747 | 12/1998 |
| JP | 11-96539 | 4/1999 |

OTHER PUBLICATIONS

International Search Report.

* cited by examiner

Primary Examiner—Stevan A. Resan
(74) Attorney, Agent, or Firm—Sughrue Mion, PLLC

(57) ABSTRACT

The magnetic recording medium of the invention comprises a substrate and a magnetic layer stacked thereon and composed of a dispersion of a ferromagnetic powder in a binder, and is characterized in that the binder contains a polyurethane resin 1 obtained by polymerization of a diol compound having a cyclic structure and a long-chain form of alkyl chain with a diisocyanate compound. Preferably, the polyurethane resin contains as diol components a dimer diol and an aliphatic diol having a medium-chain form of alkyl branched chain. The polyurethane resin may comprise a polyether polyol having a cyclic structure. A dibasic acid in the polyester polyol may contain an aliphatic dibasic acid, the diol component may contain an aliphatic diol that does not include a cyclic structure having an alkyl branched chain, and an chain extender may include a polyester polyol comprising an aliphatic diol having an alkyl branched chain.

23 Claims, No Drawings

MAGNETIC RECORDING MEDIUM

The present invention relates to a magnetic recording medium comprising a nonmagnetic substrate and a magnetic layer stacked thereon and composed of a dispersion of ferromagnetic powders and a binder, which medium has ever-higher electromagnetic performance, durability and storability.

BACKGROUND ART

Magnetic recording media are now widely used in the form of recording tapes, video tapes, and floppy disks. A magnetic recording medium comprises a magnetic recording layer which is stacked on a nonmagnetic substrate, and in which ferromagnetic powders are dispersed in a binder.

The magnetic recording medium should maintain various properties such as electromagnetic performance, run durability, and run performance at high levels.

The magnetic recording medium is now required to have such excellent electromagnetic performance and, at the same time, to have good run stability. To achieve good-enough run durability, an abrasive and a lubricant are generally added to the magnetic layer.

In equipment used with a magnetic recording medium, the medium comes into sliding contact with a magnetic head. This offers a magnetic head contamination problem in which a low-molecular component of a binder in the magnetic recording medium migrates to the vicinity of the surface of a magnetic layer, adhering to the magnetic head.

Contamination of a magnetic head is a chief cause for degradation in electromagnetic performance. In equipment for high-density recording in particular, the number of rotations of the magnetic head is now on the increase. For instance, a digital video tape recorder for use at home employs a magnetic head rotating at 9,600 rpm much higher than 1,800 rpm in the case of consumer analog video tape recorders, and 5,000 rpm in the case of commercially used analog tape recorders. At such high speeds of rotation, the sliding speed between the magnetic recording medium and the magnetic head increases. The magnetic head itself is superseded by a miniature magnetic head like a thin-film magnetic head. Thus, it is strongly required to prevent contamination of the magnetic head with components resulting from the magnetic recording medium. For a high-density magnetic recording medium used in place of a floppy disk, too, it is likewise required to develop a magnetic recording medium having high strength with high reliability.

To provide a solution to such problems, it has been proposed to increase the hardness of the magnetic layer by use of a hard binder, and to use as a binder a polyurethane resin having good wear resistance and high dispersibility as well.

For instance, JP-A 61-148626 discloses a magnetic recording medium using a polyester polyurethane resin comprising a polyester diol in which at least 20% by weight of a long-chain diol component is derived from a bisphenol or its derivative and an aromatic dibasic acid or its derivative. However, dispersibility is still less than satisfactory, with a problem arising in conjunction with a storage deterioration of the medium due to hydrolysis of ester bonds.

JP-A 1-267829 discloses a magnetic recording medium using a polyether polyol polyurethane resin in which a polyether polyol having a cyclic structure accounts for at least 80% by weight of all polyol components. However, dispersibility and durability are still unsatisfactory. JP-A 4-324110 discloses a magnetic recording medium using a polyurethane resin comprising a polyester polyol including a hydrogenated dimer acid. However, dispersibility is again insufficient due to the introduction of the hydrogenated dimer acid into a polyester polyol skeleton. In consideration of the deterioration due to hydrolysis of ester bonds, such a magnetic recording medium is better than the magnetic recording medium using bisphenol but, nonetheless, is still insufficient. In particular, a magnetic recording medium with ferromagnetic powders used for a magnetic material is insufficient in terms of storability.

An object of the present invention is to provide a magnetic recording medium having ever-higher dispersibility, coating smoothness and electromagnetic performance. Another object of the present invention is to provide a magnetic recording medium that is excellent not only in medium run durability and long-term storability but also in stability with time after the preparation of a coating solution.

DISCLOSURE OF THE INVENTION

According to one aspect of the present invention, there is provided a magnetic recording medium comprising a substrate and a magnetic layer stacked thereon and composed of a dispersion of a ferromagnetic powder in a binder, wherein said binder contains a polyurethane resin 1 obtained by polymerization of a diol compound having a cyclic structure and a long-chain form of alkyl chain with a diisocyanate compound.

Preferably, the magnetic recording medium of the invention has between said substrate and said magnetic layer a lower layer comprising a dispersion of at least one of an inorganic powder and a magnetic powder in a binder while the binder in at least one of said magnetic layer and said lower layer contains polyurethane resin 1.

Preferably in the magnetic recording medium of the invention, the polyurethane resin 1 is a polyurethane resin containing as diol components a dimer diol and an aliphatic diol having a medium-chain form of alkyl branched chain.

Preferably in the magnetic recording medium of the invention, the aforesaid polyurethane resin contains $1 \times 10^{-6}$ to $2 \times 10^{-4}$ eq/g of at least one polar group selected from the group consisting of $-SO_3M$, $-SO_4M$, $-COOM$, $-PO_3M_2$, $-PO_4M_2$, a sulfobetaine group, a phosphobetaine group, a sulfamic acid group and a sulfamic acid salt group.

Preferably in the magnetic recording medium of the invention, a branched alkyl group in the aliphatic diol having a medium-chain form of alkyl branched chain has 2 to 18 carbon atoms.

Preferably, the magnetic recording medium of the invention further contains the polyurethane resin 1 and a polyurethane resin 2 comprising a polyether polyol having a cyclic structure.

Preferably in the magnetic recording medium of the invention, the aforesaid diol compound is at least one diol compound selected from those represented by the following formulae 1 and 2:

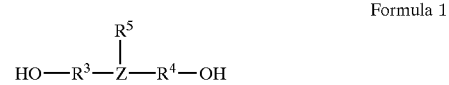

Formula 1

-continued

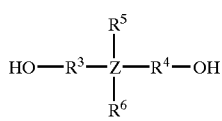
Formula 2 wherein:
  Z is selected from a benzene ring, a naphthalene ring and a cyclohexane ring,
  $R^3$ and $R^4$ are each an alkylene group having 1 to 18 carbon atoms, and
  $R^5$ and $R^6$ are each an alkyl group having 2 to 18 carbon atoms.

Preferably in the magnetic recording medium of the invention, the diol compound is at least one diol compound selected from those represented by formulae 3 to 6:

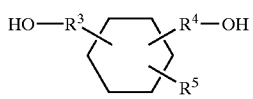
Formula 3

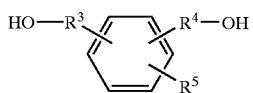
Formula 4

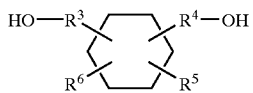
Formula 5

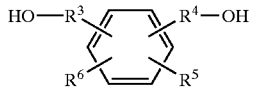
Formula 6 wherein $R^3$ and $R^4$ are each an alkylene group having 1 to 18 carbon atoms, and $R^5$ and $R^6$ are each an alkyl group having 2 to 18 carbom atoms.

Preferably in the magnetic recording medium of the invention, the aforesaid diol compound is a dimer diol represented by formula 7:

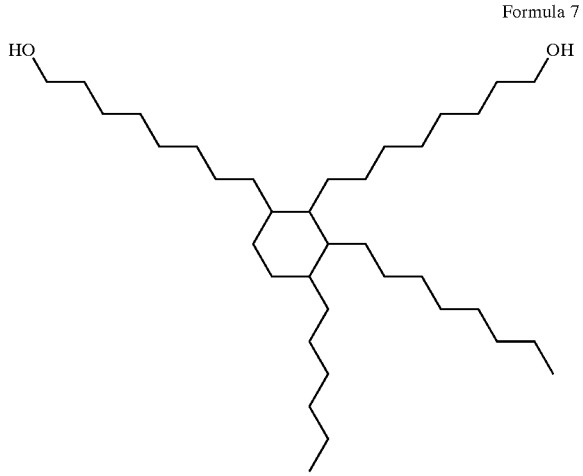
Formula 7

Preferably in the magnetic recording medium of the invention, the aforesaid polyurethane resin 2 is a polyurethane resin comprising 10 to 50% by weight of a polyol containing 1 to 6 mm/g of an ether group in polyurethane, 15 to 50% by weight of a chain extender comprising a diol having a cyclic structure and an organic diisocyanate.

Preferably in the magnetic recording medium of the invention, the aforesaid magnetic layer contains polyurethane resin 1 as the binder and the aforesaid lower layer contains polyurethane resin 2 as the binder.

Preferably in the magnetic recording medium of the invention, the aforesaid binder includes polyurethane resin 1 and a polyurethane resin 3 obtained by polymerization of a polyester polyol, a chain extender and a diisocyanate compound, said polyester polyol including as a dibasic acid an aliphatic dibasic acid and as a diol component an aliphatic diol free from a cyclic structure having an alkyl branched side chain and said chain extender including as a chain extender an aliphatic diol having an alkyl branched side chain.

Preferably in the magnetic recording medium of the invention, the aforesaid diol compound is at least one diol compound selected from those represented by the aforesaid formulae 1 and 2.

Preferably in the magnetic recording medium of the invention, the aforesaid diol compound is at least one diol compound selected from those represented by the aforesaid formulae 3 to 6.

Preferably in the magnetic recording medium of the invention, the aforesaid diol compound is a dimer diol represented by the aforesaid formula 7.

Preferably in the magnetic recording medium of the invention, the aforesaid magnetic layer includes polyurethane resin 1 as the binder and the aforesaid lower layer includes polyurethane resin 3 as the binder.

Preferably in the magnetic recording medium of the invention, the aforesaid polyurethane resin 1 includes at least 10% by weight of dimer diol in polyurethane.

Preferably in the magnetic recording medium of the invention, the aforesaid polyurethane resin 3 has an urethane group concentration of 2.5 to 4.5 mmol/g in polyurethane.

According to another aspect of the invention, there is provided a magnetic recording medium comprising a non-magnetic substrate and a magnetic layer stacked thereon and composed of a dispersion of a ferromagnetic powder in a binder, wherein said binder includes a polyurethane resin 1 as mentioned above and said magnetic layer includes a diester compound selected from those represented by formula 8 or formula 9:

Formula 8
$R^{11}$-X-$R^{22}$
Formula 9
$R^{33}$-Y-$R^{44}$ wherein:
  $R^{11}$ and $R^{22}$ are each a fatty acid residue having 5 to 21 carbon atoms,
  $R^{33}$ and $R^{44}$ are each a divalent alcohol group having 5 to 21 carbon atoms,
  X is a divalent alcohol residue having 2 to 10 carbon atoms, and
  Y is a dicarboxylic acid residue having 3 to 10 carbon atoms.

Preferably in the magnetic recording medium of the invention, a diol compound to form the aforesaid polyurethane resin 1 is at least one diol compound selected from those represented by formula 1 or formula 2.

Preferably in the magnetic recording medium of the invention, the aforesaid diol compound is at least one diol compound selected from those represented by the aforesaid formulae 3 to 6.

Preferably in the magnetic recording medium of the invention, the aforesaid diol compound is a dimer diol represented by formula 7.

Preferably in the magnetic recording medium of the invention, the aforesaid polyurethane resin 1 is a polyurethane resin that does not contain a polyester polyol having a molecular weight of 800 or greater.

Preferably in the magnetic recording medium of the invention, the aforesaid polyurethane resin 1 is a polyurethane resin containing $1\times10^{-6}$ eq/g to $2\times10^{-4}$ eq/g of at least one polar group selected from —$SO_3M$, —$SO_4M$, —COOM, —$PO_3M_2$ and —$PO_4M_2$.

BEST MODE OF CARRYING OUT THE INVENTION

According to the present invention, it has now been found that by using as the binder polyurethane resin 1 that includes a diol having a specific structure and an extremely high glass transition temperature (Tg) and ensures excellent repetitive medium run stability, dispersibility and smoothness and polyurethane resin 2 that comprises a polyester polyol having a cyclic structure, it is possible to form a magnetic layer that is improved in terms of repetitive medium run stability, dispersibility, smoothness, etc., and is of increased strength. In particular, it has been found that by the incorporation of polyurethane resin 2 into the primer or lower layer, it is possible to obtain a magnetic layer of improved durability because an ester type lubricant incorporated in the lower layer can be gradually fed to the surface of the magnetic layer by making use of its feed function.

Polyurethane resin 1 suitable for use with the present invention is a polyurethane resin that is obtained by polymerization of a diol compound having a cyclic structure and at least two long-chain form of alkyl chains with a diisocyanate compound. A conventional polyurethane type binder has been obtained through the polymerization reaction between a long-chain polyol having a molecular weight of about 2,000, such as polyether polyol or polyether polyol and a diisocyanate compound while a short-chain diol having a molecular weight of about 100 is used as a chain extender if required.

The diol component of the polyurethane used herein includes a cyclic structure selected from a benzene ring, a naphthalene ring and a cyclohexane ring and at least two alkylene groups having 1 to 18 carbon atoms optionally with two alkylene groups having 2 to 18 carbon atoms, and is halfway in size between a long-chain diol and a short-chain diol. Thus, this diol component can make the weight fraction of the diisocyanate component and urethane bonds more than could be possible with a polyurethane including a long-chain polyol, so that the dynamic strength of polyurethane can be increased due to increased intermolecular interaction of urethane bonds.

The diol component used herein is also characterized by increasing the dynamic strength of polyurethane because of having a cyclic structure selected from benzene, naphthalene and cyclohexane rings.

More specifically, the diol compound should be at least one diol compound selected from those represented by formula 1 or formula 2:

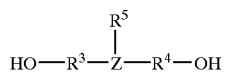

Formula 1

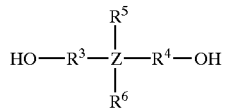

Formula 2 wherein:

Z is selected from a benzene ring, a naphthalene ring and a cyclohexane ring, $R^3$ and $R^4$ are each an alkylene group having 1 to 18 carbon atoms, and $R^5$ and $R^6$ are each an alkyl group having 2 to 18 carbon atoms.

The diol compound used herein should also be at least one diol compound selected from those represented by formulae 3 to 6:

Formula 3

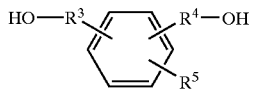

Formula 4

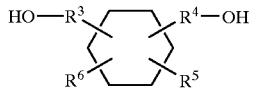

Formula 5

Formula 6 wherein $R^3$ and $R^4$ are each an alkylene group having 1 to 18 carbon atoms, and $R^5$ and $R^6$ are each an alkyl group having 2 to 18 carbom atoms.

This diol compound is also characterized by increasing the dynamic strength of polyurethane because of having a cyclic structure selected from benzene, naphthalene and cyclohexane rings.

Among these diol compounds having a cyclic structure and a long-chain form of alkyl chain, a dimer diol is particularly preferred.

The dimer diol is obtained from dimer acid, and has a chemical structure represented by the following formula 7:

Formula 7

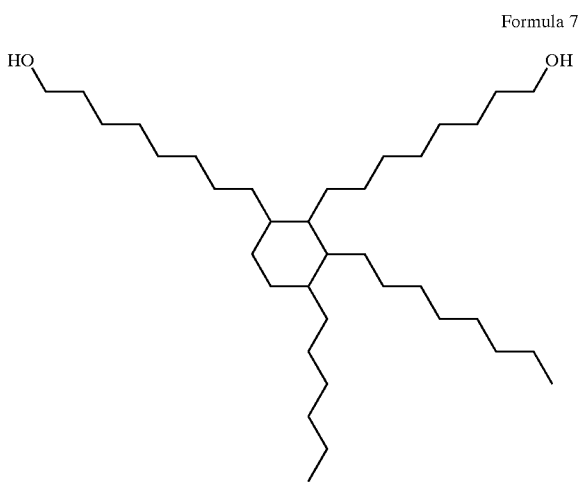

The dimer diol has a molecular weight of 537 lying halfway between that of the long-chain polyol and that of the short-chain diol. This means that the weight fraction of the diisocyanate component and urethane bonds can be more than could be possible with a polyurethane including a long-chain polyol; that is, the dynamic strength of polyurethane can be increased due to increased intermolecular interaction of urethane bonds. The fact that the dimer diol has a cyclohexane ring that is a cyclic structure, too, contributes to the increase in the dynamic strength of polyurethane.

The dimer diol is prepared by obtaining dimer acid that is a dimer of an unsaturated aliphatic carboxylic acid having 18 carbon atoms, reducing unsaturated bonds and carboxylic acid by hydrogenation and purifying the obtained product by distillation. The dimer diol has a saturated hydrocarbon in the form of a basic skeleton, and is free from any unsaturated bond and any connecting bond such as ester or ether bond across molecule.

Thus, the polyurethane resin comprising this diol and a diisocyanate compound has neither ester bonds nor ether bonds. This implies that the polyurethane resin is less susceptible to deterioration and decomposition in a high temperature and humidity environment, so that the long-term storability of a magnetic recording medium can be much more improved. In particular, the prior art polyurethane using a polyester polyol offers a grave problem in conjunction with hydrolysis of ester bond moieties and thermal decomposition of ether bonds in polyether urethane. By use of the polyurethane according to the present invention, however, this problem can be well solved.

According to the polyurethane set forth in JP-A 4-324110 referred herein to as one prior art, hydrogenated dimer acid is used for the acid component of polyester polyol to increase the overall hydrophobicity of the polymer, thereby improving the resistance of the polymer to hydrolysis. However, the resistance-to-hydrolysis problem remains still unsolved because the polymer is basically a polyester type urethane having ester bonds. In particular, this is an important problem with a magnetic recording medium using a fine grain form of metal magnetic material, because the surface catalytic activity of the magnetic material is high and accordingly the decomposition reaction of the binder is accelerated.

The dimer diol is of high solubility in solvents because of having a bent molecular structure with two long alkyl branched side chains. This contributes to dispersibility improvements because when the magnetic material is dispersed with the binder in a solvent, the binder adsorbed onto the magnetic material is likely to have such a structure or conformation as to extend its molecular chain largely. Consequently, it is possible to improve the electromagnetic performance of the magnetic recording medium.

The bent structure of the dimer diol also allows the degree of polymer chain entanglement to increase. This, combined with interaction of urethane groups due to intermolecular hydrogen bonding, achieves high dynamic strength; that is, this can make a sensible tradeoff between high modulus and large elongation at breakage. It is thus possible to increase the strength and, hence, durability of the magnetic coating in the magnetic recording medium.

The polyurethane using such a dimer diol may have such effects as mentioned above irrespective of being used for the upper layer or the lower layer. However, it is preferable to use the polyurethane for the uppermost or magnetic layer into direct contact with a head, because high electromagnetic performance and high medium run durability are achievable.

On the other hand, the polyurethane using the dimer diol is characterized by being more compatible with the ester type lubricant than a conventional polyester or polyether type polyurethane. The polyurethane described in JP-A 4-324110 already referred to as one prior art makes a negative contribution to the durability of the magnetic recording medium under repetitive run conditions in particular, because the ester type lubricant is less likely to exist on the surface of the upper layer due to its compatibility with the polyurethane resin. Especially when the polyurethane resin comprising the dimer diol is used in combination with polyurethane resin 2, it is possible to obtain a magnetic recording medium much more improved not only in coating smoothness and electromagnetic performance but also in repetitive medium run durability. In particular, polyurethane 2 has the greatest effect when used for the lower layer.

That is, polyurethane resin 2 has a function of feeding the ester type lubricant to the surface of the coating, because the ester type lubricant is less compatible with polyurethane resin 2 and so less unlikely to exist in the coating, so that the ester type lubricant can be fed from the surface of the lower layer to the upper layer. This could be a possible explanation that excellent durability is achievable. Polyurethane resin 2 also makes the lower layer-forming powders well dispersible because of having a suitable amount of ether groups. This is probably due to the ability of ether groups to be easily adsorbed onto powders. This in turn has an effect on making the lower coating smooth and accordingly the surface of the upper layer smooth.

The upper and lower layer-coating solutions are well wettable with each other, and so excellent coatability is achievable; the interface between the upper and lower layers is less susceptible to disturbance during simultaneous stacking of the upper and lower layers. It is thus possible to obtain a smooth coating. Because of including a short-chain diol having a cyclic structure, polyurethane 2 also ensures that the durability of the magnetic recording medium can be improved due to coating strength improvements.

Polyurethane resin 1 should preferably has a dimer diol content of at least 10% by weight, and especially 15 to 40% by weight in polyurethane.

For the dimer diol, commercially available dimer diols made by Henkel, Toa Gosei, etc. may be used.

The diol having a specific structure like the dimer diol according to the present invention may be used in combination with other diol. The other diol usable herein should preferably be a low-molecular diol having a molecular weight of 500 or less, and especially 300 or less.

More specifically, mention is made of aliphatic glycols such as ethylene glycol, 1,3-propanediol, propylene glycol, neopentyl glycol (NPG), 1,4-butanediol, 1,5-pentanediol, 1,6-hexanediol, 1,8-octanediol, 1,9-nonanediol, 2,2-dimetyl-1,3-propanediol, 2-ethyl-2-butyl-1,3-propanediol and 2,2-diethyl-1,3-propanediol; alicyclic glycols such as cyclohexanedimethanol (CHDM), cyclohexanediol (CHD) and hydrogenated bisphenol A (H-BPA) and their ethylene oxide adducts or propylene oxide adducts; and aromatic glycols such as bisphenol A (BPA), bisphenol S, bisphenol P and bisphenol F and their ethylene oxide adducts or propylene oxide adducts. Among these, hydrogenated bisphenol A is particularly preferred.

A long-chain diol having a molecular weight of greater than 500 is not preferred because it causes the urethane bond concentration to become low and hence the dynamic strength of polyurethane to become low. The diol used herein should preferably account for up to 50% by weight of polyurethane.

For the diisocyanate component used for the preparation of the polyurethane resin according to the present invention, use is made of known diisocyanates, preferably, TDI (tolylene diisocyanate), MDI (diphenylmethane diisocyanate), p-phenylene diisocyanate, o-phenylene diisocyanate, m-phenylene diisocyanate, xylylene diisocyanate, hydrogenated xylylene diisocyanate and isophorone diisocyanate.

The polyurethane resin should preferably have a weight-average molecular weight (Mw) of 30,000 to 70,000 and especially 40,000 to 60,000. At less than 30,000, the coating decreases in strength and durability as well. At greater than 70,000, the polyurethane resin decreases in solvent solubility and, hence, in dispersibility.

The polyurethane resin should preferably have a glass transition temperature (Tg) of 40° C. to 200° C. and especially 80° C. to 170° C. At lower than 40° C., the coating decreases in strength and hence in durability and storability at high temperatures. At higher than 200° C, processability on calendering becomes low with a drop of electromagnetic performance.

The urethane group concentration should be preferably 2.5 to 4.5 mmol/g and more preferably 3.0 to 4.0 mmol/g. At less than 2.5 mmol/g, the coating decreases in glass transition temperature (Tg) and durability as well. At greater than 4.5 mmol/g, the polyurethane resin decreases in solvent solubility with a dispersibility drop. In addition, synthesis problems such as difficulty in molecular weight control arise because no polyol can be incorporated in the polyurethane resin.

The polyurethane can contain a polar group that is at least one polar group selected from $-SO_3M$, $-OSO_3M$, $-COOM$, $-PO_3M2$ and $-PO_4M_2$ where M represents at least one member selected from a hydrogen atom, an alkaline metal and ammonium, although $-SO_3M$ and $-OSO_3M$ are preferred. The content of the polar group in polyurethane should preferably be between $1\times10^{-5}$ eq/g and $2\times10^{-4}$ eq/g. At less than $1\times10^{-5}$ eq/g, adsorption of the polyurethane onto the magnetic material becomes insufficient with a dispersibility drop. At greater than $2\times10^{-4}$ eq/g, on the other hand, the solubility of the polyurethane in solvents becomes low, again with a dispersibility drop.

Polyurethane 1 should preferably contain 2 to 20 OH groups, and especially 3 to 15 OH groups per molecule. At less than 2 OH groups per molecule, the reactivity of the polyurethane with the isocyanate curing agent drops, resulting in decreases in the strength and durability of the coating layer. At greater than 20 OH groups per molecule, on the other hand, dispersibility decreases with decreasing solvent solubility.

For the compound used for the provision of branched OH groups, use may be made of compounds with tri- or poly-functional OH groups, as mentioned below.

That is, it is preferable to use trimethylolethane, trimethylolpropane, trimellitic acid anhydride, glycerin, pentaerythritol, hexanetriol, branched polyesters having tri- or poly-functional OH groups, and poletherpolyesters.

Among others, the compounds having trifunctional OH groups are particularly preferred. Compounds having tetra- or poly-functional OH groups react with the curing agent at too fast a rate, resulting in a pot life decrease.

Polyurethane resin 2 may be produced by polymerization of a short-chain diol having a cyclic structure and a polyol having an ether group together with other low-molecular diol using a diisocyanate.

For the short-chain diol having a cyclic structure, mention is made of bisphenol A, hydrogenated bisphenol A, bisphenol S, hydrogenated bisphenol S, bisphenol P and hydrogenated bisphenol P to which ethylene oxide, and propylene oxide may have been added. Among these, hydrogenated bisphenol A and bisphenol A with propylene oxide added thereto are preferred. The short-chain diol having a cyclic structure should preferably account for 20 to 40% by weight of polyurethane resin 2. At less than 20% by weight, the dynamic strength of polyurethane 2 becomes low with a durability drop. At greater than 40% by weight, on the other hand, solvent solubility drops with a dispersibility drop.

For the ether group-containing polyol used herein, mention is made of bisphenol A, hydrogenated bisphenol A, bisphenol S, hydrogenated bisphenol S, bisphenol P and hydrogenated bisphenol P to which ethylene oxide, and propylene oxide may have been added. Among these hydrogenated bisphenol A and bisphenol A with propylene oxide added thereto are preferred.

The content of the ether group-containing polyol in polyurethane resin 2 should preferably be between 20% by weight and 45% by weight. At less than 20% by weight, polyurethane resin 2 is less susceptible to adsorption onto powders, resulting in a dispersibility drop. At greater than 45% by weight, on the other hand, durability decreases because of a drop of coating strength.

The ether group concentration of the polyurethane should be preferably 1 to 6 mmol/g, and more preferably 3 to 6 mmol/g.

At smaller than 1 mmol/g, dispersibility drops whereas at larger than 6 mmol/g, durability is likely to drop due to a coating strength decrease.

The diol usable in combination with the polyol should be a low-molecular diol having a molecular weight of preferably up to 500, and more preferably up to 300.

Specific mention is made of aliphatic glycols such as ethylene glycol, 1,3-propanediol, propylene glycol, neopentyl glycol (NPG), 1,4-butanediol, 1,5-pentanediol, 1,6-hexanediol, 1,8-octanediol, 1,9-nonanediol, 2,2-dimethyl-1,3-propanediol, 2-ethyl-2-butyl-1,3-propanediol and 2,2-diethyl-1,3-propanediol; alicyclic glycols such as cyclohexanedimethanol (CHDM), cylcohexanediol (CHD) and hydrogenated bisphenol A (H-BPA); and aromatic glycols such as bisphenol A (BPA), bisphenol S, bisphenol P and bisphenol F.

The diol usable herein includes a number of diols; however, it is not preferable to use polyester diol and polyether diol.

A long-chain diol having a molecular weight of greater than 500 is not preferred because it causes the urethane bond concentration to become low and hence the dynamic strength of the polyurethane to become low. The diol used herein should preferably account for up 50% by weight of polyurethane.

For the diisocyanate component, use is made of known diisocyanates, preferably, TDI (tolylene diisocyanate), MDI (diphenylmethane diisocyanate), p-phenylene diisocyanate, o-phenylene diisocyanate, m-phenylene diisocyanate, xylylene diisocyanate, hydrogenated xylylene diisocyanate and isophorone diisocyanate.

The urethane group concentration should be preferably 2.5 to 4.5 mmol/g and more preferably 3.0 to 4.0 mmol/g. At less than 2.5 mmol/g, the coating decreases in glass transition temperature (Tg) and durability as well. At greater than 4.5 mmol/g, the polyurethane resin decreases in solvent solubility with a dispersibility drop. In addition, synthesis problems such as difficulty in molecular weight control arise because no polyol can be incorporated in the polyurethane resin. Too much urethane groups give rise to a dispersibility drop.

Polyurethane resin 2 should preferably have a weight-average molecular weight (Mw) of 30,000 to 70,000 and especially 40,000 to 60,000. At less than 30,000, the coating decreases in strength and durability as well. At greater than 70,000, the polyurethane resin decreases in solvent solubility and, hence, in dispersibility.

The polyurethane resin should preferably have a glass transition temperature (Tg) of 40° C. to 200° C. and especially 70° C. to 180° C.

At lower than 40° C., the coating decreases in strength and hence in durability and storability at high temperatures. At higher than 200° C., processability on calendering becomes low with a drop of electromagnetic performance.

The polyurethane can contain a polar group that is at least one polar group selected from —$SO_3M$, —$OSO_3M$, —COOM, —$PO_3M_2$ and —$PO_4M_2$ where M represents at least one member selected from a hydrogen atom, an alkaline metal and ammonium, although —$SO_3M$ and —$OSO_3M$ are preferred. The content of the polar group in polyurethane should preferably be between $1\times10^{-5}$ eq/g and $2\times10^{-4}$ eq/g. At less than $1\times10^{-5}$ eq/g, adsorption of the polyurethane onto the magnetic material becomes insufficient with a dispersibility drop. At greater than $2\times10^{-4}$ eq/g, on the other hand, the solvent solubility of the polyurethane becomes low, again with a dispersibility drop.

Polyurethane 2 should preferably contain 2 to 20 OH groups, and especially 4 to 15 OH groups per molecule. At less than 3 OH groups per molecule, the reactivity of the polyurethane with the isocyanate curing agent drops, resulting in decreases in the strength and durability of the coating layer. At greater than 15 OH groups per molecule, on the other hand, dispersibility decreases with decreasing solvent solubility.

Polyurethane resin 2, for instance, may be a polyurethane resin comprising a polyether polyol having the chemical structure:

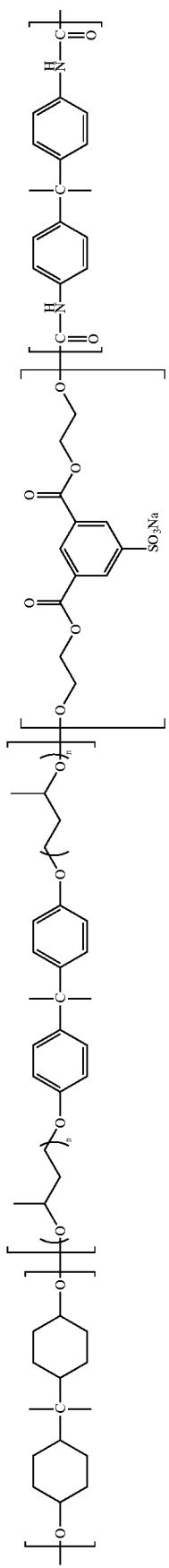

When diester compounds represented by the following formulae 8 and 9 are used as the lubricant, the present invention is also characterized in that the lubricant is greatly compatible with the dimer diol-containing polyurethane resin according to the present invention.

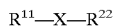 Formula 8

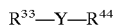 Formula 9 where $R^{11}$ and $R^{22}$ are each a fatty acid residue having 5 to 21 carbon atoms, $R^{33}$ and $R^{44}$ are each a divalent alcohol group having 5 to 21 carbon atoms, X is a divalent alcohol residue having 2 to 10 carbon atoms, and Y is a dicarboxylic acid residue having 3 to 10 carbon atoms. So far, it has been found that when the compatibility of an ester type lubricant with a binder is high, there is a problem that the ester type lubricant plasticizes the binder, resulting in a drop of the strength of the binder and, eventually, a drop of the durability of a magnetic recording medium. However, the polyurethane resin according to the present invention is so increased in dynamic strength that even when compatible with the diester type lubricant, it ensures high durability because of having still sufficient dynamic strength. Probably because the lubricant entrapped in the binder migrates slowly to the surface of a tape, the durability of the tape during high-speed sliding is improved. By making use of this property of the lubricant of migrating slowly to the surface, it is possible to make the content of the diester lubricant in the surface of the magnetic layer so low that the coefficient of friction of the tape at low speed can be lowered to improve the repetitive run durability of the tape.

In the lubricant used in the present invention and comprising the diester compound represented by formula: $R^{11}$—X—$R^{22}$, the divalent alcohol residue having 2 to 10 carbon atoms, represented by X, may be ethylene glycol, neopentyl glycol, 1,3-propanediol, 1,2-propylene glycol, 1,3-butanediol and 1,4-butanediol. Among these, preference is given to 1,2-propylene glycol, 1,3-butanediol and 1,4-butanediol residues although ethylene glycol, neopentyl glycol and 1,3-propanediol are particularly preferred.

$R^{11}$ and $R^{22}$ should preferably be each a fatty acid residue having 5 to 21 carbon atoms, which may be either in a branched chain form or in a straight-chain form. It is also preferable that the carbon chain contains an unsaturated bond, and $R^{11}$ and $R^{22}$ have the same structure.

Moreover, it is preferable that $R^{11}$ and $R^{22}$ have 5 to 21 carbon atoms, and especially 8 to 17 carbon atoms per chain length. Too little carbon atoms make the lubricant susceptible to volatilization, and causes the content of the lubricant in the surface of the magnetic layer to decrease as temperature rises during friction, resulting in a drop of the durability of the magnetic layer.

Too much makes the viscosity of the lubricant high, giving rise to a drop of fluid lubrication and a durability drop.

Preferable compounds, for instance, are neopentyl glycol dioleate, ethylene glycol dioleate, neopentyl glycol dimyristate, neopentyl glycol dilaurate, neopentyl glycol didecanoate and neopentyl glycol dioctanoate.

In the lubricant comprising the diester compound represented by formula 9: $R^{33}$—Y—$R^{44}$, the dicarboxylic acid residue having 3 to 10 carbon atoms, represented by Y, may be saturated dicarboxylic acid residues such as malonic, succinic, glutaric, adipic, pimelic, suberic, azelaic, sebacic, methylmalonic, ethylmalonic and propylmalonic acid residues; and unsaturated dicarboxylic acid residues such as maleic, fumaric, glutaconic, itaconic and muconic acid residues.

$R^{33}$ and $R^{44}$ is an alcohol residue having 5 to 21 carbon atoms, which may be either a branched-chain aliphatic alcohol or a straight-chain aliphatic alcohol, irrespective of being unsaturated or saturated. It is preferable that $R^{33}$ and $R^{44}$ have the same structure especially with 8 to 18 carbon atoms.

The amount of the diester added according to the present invention should be preferably 0.1 to 50 parts, and more preferably 2 to 25 parts per 100 parts by weight of magnetic or nonmagnetic powders.

The diester compound according to the present invention may be used in combination with other lubricant. For the other lubricant usable herein, ester compounds and fatty acids may be used. Preferable ester compounds, for instance, are saturated fatty acid esters, unsaturated fatty acid esters, and esters of alkylene oxide-added alcohols and fatty acids.

More specifically, it is preferable to use butyl stearate, butyl palmitate, butyl myristate, amyl stearate, amyl palmitate, amyl myristate, 2-ethylhexyl stearate, oleyl oleate, oleyl stearate, butoxyethyl stearate, butoxydiethylene glycol stearate, and so on.

Unsaturated fatty acids having 12 to 22 carbon atoms are preferable for the fatty acid, although palmitoleic acid, oleic acid, erucic acid and linolic acid are more preferable.

The polyurethane resins according to the present invention may be used in combination with a vinyl chloride type synthetic resin. The vinyl chloride type resin usable herein should have a degree of polymerization of preferably 200 to 600, and more preferably 250 to 450. The vinyl chloride type resin may have been obtained by copolymerization of vinylic monomers such as vinyl acetate, vinyl alcohol, vinylidene chloride and acrylonitrile.

In addition to the polyurethane resins according to the present invention as well as the vinyl chloride type resin, various synthetic resins may be used for the formation of each magnetic layer. For instance, use may be made of ethylene-vinyl acetate copolymers, cellulose derivatives such as nitrocellulose resin, acrylic resin, polyvinyl acetal resin, polyvinyl butyral resin, epoxy resin and phenoxy resin. These resins may be used alone or in combination of two or more.

When the other synthetic resin is used, the polyurethane included in the magnetic layer should account for preferably 10 to 90% by weight, more preferably 20 to 80% by weight, and even more preferably 25 to 60% by weight of binder. Similarly, the vinyl chloride type resin should account for preferably 10 to 80% by weight, more preferably 20 to 70% by weight, and even more preferably 30 to 60% by weight of binder.

According to the present invention, the binder may be used with a curing agent such as a polyisocyanate compound. Exemplary polyisocyanate compounds include a reaction product between 3 moles of tolylene diisocyanate and 1 mole of trimethylolpropane (e.g., Desmodur L-75 made by Bayer), reaction products between 3 moles of diisocyanates such as xylylene diisocyanate and hexamethylene diisocyanate and 1 mole of trimethylolpropane, an adduct of 3 moles of tolylene diisocyanate with burette, an isocyanurate compound of 5 moles of tolylene diisocyanate, an adduct of 3 moles of tolylene diisocyanate and 2 moles of hexamethylene diisocyanate with isocyanurate, and a polymer of isophorone diisocyanate with diphenylmethane diisocyanate.

The polyisocyanate compound included in the magnetic layer should account for preferably 10 to 50% by weight, and more preferably 20 to 40% by weight of binder.

When electron beam irradiation is used for curing, a compound having a reactive double bond, e.g., urethane acrylate may be used.

The total weight of the resin component and curing agent (i.e., the binder) should preferably be in the range of usually 15 to 40 parts by weight, and especially 20 to 30 parts by weight per 100 parts by weight of ferromagnetic powders.

For the ferromagnetic powders for use with the magnetic recording medium of the invention, it is desired to employ cobalt-containing ferromagnetic iron oxide powders or cobalt-containing ferromagnetic alloy powders having an $S_{BET}$ specific surface area of 40 to 80 m²/g, and preferably 50 to 70 m²/g. Crystallite size is 12 to 25 nm, preferably 13 to 22 nm, and more preferably 14 to 20 nm. Length is 0.05 to 0.25 μm, preferably 0.07 to 0.2 μm, and more preferably 0.08 to 0.15 μm. The ferromagnetic powders used herein may be those based on Fe, Fe—Co, Fe—Ni and Co—Ni—Fe systems containing yttrium. Referring to the content of yttrium in the ferromagnetic powders, it is preferable that the ratio of yttrium atoms to iron atoms, Y/Fe, is between 0.5 at % and 20 at %, and especially between 5 at % and 10 at %. At lower than 0.5 at %, the σS of ferromagnetic powders cannot increase, resulting in drops of magnetic properties and electromagnetic performance. At greater than 20 at %, the content of iron decreases, again resulting in drops of magnetic properties and electromagnetic performance. Additionally, the ferromagnetic powders may contain elements such as aluminum, silicon, sulfur, scandium, titanium, vanadium, chromium, manganese, copper, zinc, molybdenum, rhodium, palladium, tin, antimony, boron, barium, tantalum, tungsten, rhenium, gold, lead, phosphorus, lanthanum, cerium, praseodymium, neodymium, tellurium and bismuth in the range of up to 20 at % per 100 at % of iron atom. The ferromagnetic metal powders may also contain small amounts of water, hydroxides or oxides.

One example of the production process of ferromagnetic powders with cobalt and yttrium introduced therein will now be explained.

In this case, iron hydroxide oxide obtained by blowing an oxidizing gas into an aqueous suspension composed of an ferrous salt-alkali mixture may be used as the starting material.

A preferable type of iron hydroxide oxide is α-FeOOH that is typically produced by two processes. According to one process, an acicular form of α-FeOOH is obtained by preparing an aqueous suspension of Fe(OH)$_2$ by neutralizing a ferrous salt with alkali hydroxide and then blowing an oxidizing gas into the suspension. According to another production process, a spindle form of α-FeOOH is obtained by preparing an aqueous suspension of FeCO$_3$ by neutralizing a ferrous salt with alkali carbonate and then blowing an oxidizing gas into the suspension. Preferably, such iron hydroxide oxide should be obtained by allowing a ferrous salt aqueous solution to react with an alkali aqueous solution to obtain a ferrous hydroxide-containing aqueous solution and oxidizing ferrous hydroxide with air, etc. In this case, it is acceptable that Ni salts, salts of alkaline earth elements such as Ca, Ba and Sr, Cr salts, Zn salts or the like are present in the ferrous salt aqueous solution. By making a suitable selection from these salts, it is possible to control particle shapes such as aspect ratios.

For the ferrous salt, for instance, it is preferable to use ferrous chloride and ferrous sulfate. For the alkali, for instance, it is preferable to use sodium hydroxide, ammonia water, ammonium carbonate and sodium carbonate. For the coexisting salts, for instance, it is preferable to use chlorides such as nickel chloride, calcium chloride, barium chloride, strontium chloride and zinc chloride.

When cobalt is then introduced into iron, an aqueous solution of a cobalt compound such as cobalt sulfate, and cobalt chloride is stirred and mixed with a slurry of the aforesaid iron hydroxide oxide before the introduction of yttrium. After the preparation of the slurry of the cobalt-containing iron hydroxide oxide, an aqueous solution containing an yttrium compound is added to the slurry. Cobalt may be introduced into iron by stirring and mixing this slurry.

In addition to yttrium, neodymium, samarium, lanthanum, praseodymium, etc., too, may be introduced into the ferromagnetic powders according to the present invention. These may also be introduced into the powders in the form of chlorides such as yttrium chloride, neodymium chloride, samarium chloride, praseodymium chloride and lanthanum chloride and nitrates such as gadolinium, which may be used alone or in combination of two or more.

Usually but not exclusively, the ferromagnetic powder of the invention may be used in an acicular, granular, dice, grain-of-rice, and sheet form. It is particularly preferable to use an acicular form of ferromagnetic powders.

The above resin component, curing agent and ferromagnetic powders are milled and dispersed with a solvent ordinarily used for the preparation of magnetic coating materials, for instance, methyl ethyl ketone, dioxane, cyclohexanone, and ethyl acetate to form a magnetic coating material. Milling and dispersion should preferably be carried out as usual.

It is here to be noted that the magnetic coating material may contain, in addition to the above components, ordinarily used additives and fillers, for instance, abrasives such as α-Al$_2$O$_3$ and Cr$_2$O$_3$, antistatics such as carbon black, and lubricants and dispersants such as fatty acids, fatty esters, and silicone oil.

Then, the lower nonmagnetic layer or lower magnetic layer in the multilayer structure of the invention is explained. The inorganic powders used for the lower layer according to the present invention may be either magnetic powders or nonmagnetic powders. The nonmagnetic powders, for instance, may be selected from inorganic compounds such as metal oxides, metal carbonates, metal sulfates, metal nitrides, metal carbides and metal sulfides. For the inorganic compounds, for instance, use may be made of α-alumina having an α-phase content of 90 to 100%, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate and molybdenum disulfide. These may be used alone or in combination of two or more. Particular preference is given to titanium dioxide, zinc oxide, iron oxide and barium sulfate, with the titanium dioxide being most preferred. Preferably, these nonmagnetic powders have an average particle size of 0.005 to 2 μm. However, the advantages of the present invention may be obtained even when nonmagnetic powders with varying average particle size are used in combination of two or more, or a single type of nonmagnetic powders having a wide particle size distribution are used. More preferably, the nonmagnetic powders should have an average particle size of 0.01 μm to 0.2 μm and a pH value between 6 and 9. The nonmagnetic powders should have a specific surface area of preferably 1 to 100 m²/g, more preferably 5 to 50 m²/g, and even more preferably 7 to 40 m²/g. Also, the nonmagnetic powders should have a crystallite size of preferably 0.01 μm to 2 μm, a DBP oil absorption of 5 to 100 ml/100 g, preferably 10 to 80 ml/100 g and more preferably 20 to 60 ml/100 g, and a specific gravity of 1 to 12 and preferably 3 to 6. The nonmagnetic powders used may be in an acicular, spherical, polyhedral or sheet form.

Preferably, the nonmagnetic powders should be surface-treated to allow $Al_2O_3$, $SiO_2$, $TiO_2$, $ZrO_2$, $SnO_2$, $Sb_2O_3$, and ZnO to be present on the surface thereof. Particular preference is given to $Al_2O_3$, $TiO_2$, $SiO_2$ and $ZrO_2$ because of their excellent dispersibility, among which $Al_2O_3$, $SiO_2$ and $ZrO_2$ are most preferred. These compounds may be used alone or in combination of two or more. Alternatively, use may be made of a surface-treated layer subjected to co-precipitation depending on purpose. Still alternatively, the surface of the nonmagnetic powder may be treated with alumina, and the alumina layer may then be treated with silica, and vice versa. The surface-treated layer may be a porous layer depending on purpose, although it is preferably a homogeneous, intimate layer.

If carbon black is mixed with the lower layer, it is then possible to achieve an Rs decrease as carried out in the prior art, and obtain a micro-Vickers hardness as desired. To this end, use may be made of furnace black for rubber, thermal black for rubber, coloring carbon black, acetylene black, etc.

The carbon black herein used should have a specific surface area of 100 to 500 $m^2/g$ and preferably 150 to 400 $m^2/g$, a DBP oil absorption of 20 to 400 ml/100 g and preferably 30 to 200 ml/100 g, an average particle size of 5 m$\mu$ to 80 m$\mu$, preferably 10 to 50 m$\mu$ and more preferably 10 to 40 m$\mu$, a pH value of 2 to 10, a water content of 0.1 to 10%, and a tap density of 0.1 to 1 g/ml. Exemplary products of the carbon black used herein are BLACK PEARLS 2000, 1300, 1000, 900, 800, 880, and 700, and VULCAN XC-72, all made by Cabot Co., Ltd., #3050B, 3150B, 3250B, #3750B, #3950B, #950, #650B, #970B, #850B, and MA-600, all made by Mitsubishi Chemical Industries, Ltd., CONDUCTEX SC, and RAVEN 8800, 8000, 7000, 5750, 5250, 3500, 2100, 2000, 1800, 1500, 1255, and 1250, all made by Colombian Carbon Co., Ltd., and Ketchen Black EC made by Aczo Co., Ltd.

Magnetic powders may also be used for the lower layer according to the present invention. The magnetic powders used herein, for instance, are $\gamma$-$Fe_2O_3$, Co-doped $\gamma$-$Fe_2O_3$, alloys composed mainly of $\alpha$-Fe, and $CrO_2$, among which the Co-doped $\gamma$-$Fe_2O_3$ is most preferred. The ferromagnetic powders used for the lower layer according to the present invention should preferably the same composition and performance as in the upper magnetic layer according to the present invention. However, the performance of the upper and lower layers may be varied depending on purpose, as usually carried out in the prior art. To improve longer wavelength recording performance, for instance, it is desired to make the Hc of the lower magnetic layer lower than that of the upper magnetic layer, and make the Br of the lower magnetic layer higher than that of the upper magnetic layer. In addition, it is possible to take advantage of a known multilayer structure.

The binder, lubricant, dispersant, additive and solvent, and dispersion techniques used for the lower magnetic, and nonmagnetic layers may be the same as in known magnetic layers. In particular, the techniques available for the known magnetic layers may be applied to the amount and type of binder, and the amount and type of solvent and dispersant.

The magnetic coating material prepared from the above materials is coated on the nonmagnetic substrate to form a magnetic layer.

Known substrates such as biaxially stretched polyethylene naphthalate, polyethylene terephthalate, polyamide, polyimide, polyamide-imide, aromatic polyamide, and polybenzoxidazole substrates may be used for the nonmagnetic substrate used herein. Among these, the polyethylene, and aromatic polyamide substrates are preferred. These nonmagnetic substrates may have been subjected to pre-treatments such as corona discharge treatment, plasma treatment, easy-to-bond treatment, and thermal treatment. The nonmagnetic substrate used herein should preferably have a very smooth surface as represented by a center-line average surface roughness between 0.1 nm and 20 nm and especially 1 nm and 10 nm at a cut-off value of 0.25 mm. Further, the nonmagnetic substrate should not only have a small center-line average surface roughness but also be free from any coarse asperity of greater than 1$\mu$.

For instance, the magnetic recording medium of the invention may be fabricated by coating a coating solution for the magnetic layer on the surface of the moving nonmagnetic substrate in such a way that the magnetic layer has a thickness between 0.05 $\mu$m and 1 $\mu$m and preferably 0.07 $\mu$m and 0.5 $\mu$m and the lower layer has a thickness of 0.5 to 2,0 $\mu$m and especially 1.0 to 1.5 $\mu$m, as measured after drying. In this case, a plurality of coating materials may concurrently or successively be coated on the nonmagnetic substrate.

For the purpose of applying the magnetic coating material, various coating machines may be used, inclusive of air doctor coating, blade coating, rod coating, extrusion coating, air knife coating, squeeze coating, dip coating, reverse roll coating, transfer roll coating, gravure coating, kiss coating, cast coating, spray coating, and spin coating machines.

For these machines, for instance, refer to "The State-of-the-Art Coating Techniques", published by Sogo Gijutsu Center Co., Ltd. on May 31, 1983.

When the present invention is applied to a magnetic recording medium comprising two or more layers, it is preferable to use the following coating machines and methods.

(1) First, the lower layer is coated on a nonmagnetic substrate using a coating machine generally used for the coating of magnetic coating materials, for instance, a gravure, roll, blade or extrusion coating machine. Then, the upper layer is coated on the lower layer while the lower layer remains still undried, using a substrate pressing type extrusion coating machine as disclosed in JP-B 1-46186, and JP-A's 60-238179 and 2-265672.

(2) The lower, and upper layers are almost concurrently coated on a nonmagnetic substrate, using a single coating head having two coating solution supply slits, as disclosed in JP-A's 63-88080, 2-17971 and 2-265672.

(3) The lower, and upper layers are almost concurrently coated on a nonmagnetic substrate, using an extrusion coating machine provided with a backup roll, as disclosed in JP-A 2-174965.

A backing layer may be provided on the surface of the nonmagnetic substrate used herein, which has no magnetic coating material coated thereon. Usually, the backing layer is obtained by coating the magnetic coating material-free surface of the nonmagnetic substrate with a backing layer-forming coating material in which granular components such as abrasives and antistatics and a binder are dispersed together in an organic solvent.

It is here to be noted that both surfaces of the nonmagnetic substrate may have been coated with adhesive layers.

The coating layer obtained by applying the magnetic coating material on the nonmagnetic substrate is dried after the ferromagnetic powders contained in the coating layer have been oriented in a magnetic field.

The thus dried coating layer is subjected to a surface-smoothing treatment. For the surface-smoothing treatment, for instance, a super-calender roll may be used. By carrying out the surface-smoothing treatment, it is possible to obtain a magnetic recording medium having high electromagnetic performance, because the filling rate of the ferromagnetic powders with respect to the magnetic layer is increased by the vanishing of voids caused by removal of the solvent upon drying.

Heat-resistant plastic rolls such as epoxy, polyimide, polyamide, and polyamide-imide rolls may be used as the calendering roll. A metal roll, too, may be used to this end.

The magnetic recording medium of the present invention should preferably have an extremely smooth surface as represented by a center-line average surface roughness of 0.1 nm and 4 nm and especially 1 nm and 3 nm at a cut-off value of 0.25 mm. To this end, for instance, it is preferable to subject the magnetic layer made up of a specific ferromagnetic powder and a selected binder to the aforesaid calender treatment. Referring here to the calender treatment conditions, the calender roll is controlled in the temperature range of 60 to 100° C., preferably 70 to 100° C. and more preferably 80 to 100° C., and the calendering pressure is controlled in the range of 100 to 500 kg/cm$^2$, preferably 200 to 450 kg/cm$^2$ and more preferably 300 to 400 kg/cm$^2$.

The thus obtained magnetic recording medium may be cut by a cutter or the like into any desired shape.

The binder comprising the polyurethane resins and used in the magnetic recording medium according to the present invention is quite different from the prior art binder comprising a conventional polyurethane. That is, the conventional polyurethane type binder has been obtained through the polymerization reaction between a polyester polyol having a molecular weight of about 2,000, a long-chain polyol such as polyether polyol and a diisocyanate compound while a short-chain diol having a molecular weight of about 100 is used as a chain extender if required.

However, the dimer diol contained in the diol component of the polyurethane resin according to the present invention has a molecular weight of 536 lying halfway between those of the long-chain and short-chain polyols used for the conventional polyurethane. This means that the weight fraction of the diisocyanate component and urethane bonds can be more than would be possible with a polyurethane including a long-chain polyol; that is, the dynamic strength of polyurethane can be increased due to increased intermolecular interaction of urethane bonds.

The fact that the dimer diol has a cyclohexane ring that is a cyclic structure, too, contributes to the increase in the dynamic strength of polyurethane. The bent structure of the dimer diol also allows the degree of polymer chain entanglement to increase. This, combined with interaction of urethane groups due to intermolecular hydrogen bonding, achieves high dynamic strength; that is, this can make a sensible tradeoff between high modulus and large elongation at breakage. It is thus possible to increase the strength and, hence, durability of the magnetic coating in the magnetic recording medium.

The dimer diol is an unsaturated bond-free diol that is derived by hydrogenation of dimer acid with high purity and is free of any hydrophilic connecting bond such as ester or ether bond across molecule. For this reason, the dimer diol is excellent in heat. stability, resistance to hydrolysis and storability.

Moreover, the aliphatic diol used in combination with the dimer diol and including a medium-chain form of alkyl branched chain, for instance, an aliphatic diol branched by an alkyl group having at least 2 carbon atoms is lower in molecular weight than the dimer diol, so that the content of the diisocyanate component in polyurethane can be increased to increase the concentration of urethane bonds and, hence, to increase the dynamic strength, heat resistance and Tg of polyurethane.

The urethane bonds, when present in solid, may serve to increase its dynamic strength and heat resistance due to hydrogen bonds. A problem with the urethane bonds is, however, that when they are present in liquid, the intermolecular interaction of polymer is increased and so the viscosity of the solution is increased, resulting in drops of the dispersibility of a magnetic material and the smoothness of a magnetic coating. The extreme case is that the urethane bonds decrease in solvent solubility to such a degree that they cannot be dissolved in solvents such as MEK, MIBK, toluene and cyclohexane. However, it has now been found that the alkyl branched chain of the diol according to the present invention blocks hydrogen bonds in the urethane bonds so that the viscosity of solution can be decreased to increase the smoothness of the magnetic coating and improve the stability upon dispersion of the magnetic material. The dimer diol is also of high solvent solubility because of having a bent molecular structure with two ($C_6$, $C_8$) long alkyl branched side chains. This contributes to dispersibility improvements because when the magnetic material is dispersed with the binder in a solvent, the binder adsorbed onto the magnetic material is likely to have such a structure or conformation as to extend its molecular chain largely. Consequently, it is possible to improve the electromagnetic performance of the magnetic recording medium.

Unlike the commonly used polyester polyurethane (polyurethane obtained by polymerization of polyester polyol with diisocyanate) and polyether polyurethane (urethane obtained by polymerization of polyether polyol with diisocyanate), the polyurethane resin of the present invention has basically neither ester bonds nor ether bonds. This implies that the polyurethane resin is less susceptible to deterioration and decomposition in a high temperature and humidity environment, so that the long-term storability of the magnetic recording medium can be much more improved. In particular, the prior art polyurethane using polyester polyol offers a grave problem in conjunction with hydrolysis of ester bond moieties and thermal decomposition of ether bonds in polyether urethane. By use of the polyurethane according to the present invention, however, this problem can be well solved.

With the prior art polyurethane designed to increase and improve the whole hydrophobicity and resistance to hydrolysis of polymer by using hydrogenated dimer acid for the acid component of polyester polyol, this problem cannot essentially be solved because it is a polyester type urethane containing ester bonds. In particular, this is an important problem with a recent magnetic recording medium using a fine grain form of metal magnetic material, because the surface catalytic activity of the magnetic material is high and accordingly the decomposition reaction of the binder is accelerated. With the polyurethane of the present invention, this problem, too, can of course be solved.

EXAMPLE

The present invention will now be explained in more specifically with reference to the following examples and comparative examples.

Unless otherwise stated, "parts" means parts by weight.

Examples 1-1 to 1-5 & Comparative Example 1-1

Synthesis of the Polyurethane Resin

The starting materials shown in Table 1-1 were charged in a mixed solvent of cyclohexanone and toluene at 1:1 in the amounts shown in Table 1-1 for polymerization by a one-shot process. In Table 1-1 are also shown the glass transition temperatures and weight-average molecular weights, Mw's, of the obtained polyurethane polymers.

TABLE 1-1

| Polyurethane Resin | Diol Component | | | | | | Polar Group |
|---|---|---|---|---|---|---|---|
| | DD | EEPr | EBPr | EPe | NPG | PES | DEIS |
| Polyurethane a | 139.4 | 26.4 | 0 | 0 | 0 | 0 | 4 |
| Polyurethane b | 53.6 | 47.52 | 0 | 0 | 0 | 0 | 4 |
| Polyurethane c | 26.8 | 54.12 | 0 | 0 | 0 | 0 | 4 |
| Polyurethane d | 139.4 | 0 | 32 | 0 | 0 | 0 | 4 |
| Polyurethane e | 139.0 | 0 | 0 | 26.4 | 0 | 0 | 4 |
| Polyurethane f | 0 | 0 | 0 | 0 | 10.4 | 727.2 | 12 |

| Polyurethane Resin | Diisocyanate MDI | Tg (° C.) | Mw | Urethane Group $10^{-3}$ eq/g | $SO_3M$ $10^{-5}$ eq/g |
|---|---|---|---|---|---|
| Polyurethane a | 123 | 86 | 35,000 | 3.4 | 6.0 |
| Polyurethane b | 123 | 135 | 41,000 | 4.3 | 7.6 |
| Polyurethane c | 123 | 178 | 36,000 | 4.7 | 8.4 |
| Polyurethane d | 123 | 67 | 42,000 | 3.3 | 5.8 |
| Polyurethane e | 123 | 79 | 54,000 | 3.4 | 5.9 |
| Polyurethane f | 123 | 36 | 45,000 | 1.1 | 5.7 |

DD: dimer diol
EEPr: 2,2-diethyl-1,3-propanediol
EBPr: 2-ethyl-2-butyl-1,3-propanediol
EPe: 3-ethyl-1,5-pentanediol
NPG: neopentyl glycol
PES: polyester polyol (hydrogenated dimer acid/isophthalic acid/1,6-hexanediol = 1.8/2.7/5.4 mol, Mw = 2,020)
DEIS: sodium bis(hydroxyethyl)-5-sulfoisophthalate
MDI: diphenylmethane diisocyanate
The figures are given in a part-by-weight unit.

Preparation of the Magnetic Recording Medium

One hundred (100) parts of ferromagnetic alloy powders (composition: 92% Fe, 4% Zn and 4% Ni, Hc: 2,000 Oe, crystallite size: 15 nm, BET specific surface area: 59 m²/g, length: 0.12 μm, aspect ratio: 7, and σs: 140 emu/g) were pulverized in an open kneader for 10 minutes. Then, the powders were mixed and milled for 30 minutes with 1 part of phenylphosphoric acid, 10 parts by methyl ethyl ketone, 3 parts of cyclohexanone and 3 parts of toluene.

Then, 5 parts of a vinyl chloride type binder (MR110 made by Nippon Zeon Co., Ltd.), 5 parts of the polyurethane resin shown in Table 1-1, 15 parts of methyl ethyl ketone and 10 parts of methyl isobutyl ketone were added to and milled with the mixture for 60 minutes. Then, the mixture was dispersed for 120 minutes in a sand mill with the addition thereto of the following components:

| Abrasive ($Al_2O_3$ with a particle size of 0.3 μm) | 2 parts |
|---|---|
| Carbon black (with a particle size of 0.1 μm) | 2 parts |
| Methyl ethyl ketone/toluene | 250 parts |

The dispersion was stirred and mixed together for a further 20 minutes with the addition thereto of the following components:

| Polyisocyanate (Colonate 3041 made by Nippon Polyurethane Co., Ltd.) | 5 parts (on a solid content basis) |
|---|---|
| Isoamyl stearate | 2 parts |
| Stearic acid | 1 part |
| Methyl ethyl ketone | 50 parts |

Thereafter, the mixture was filtered through a filter having an average pore diameter of 1 μm to prepare a magnetic coating material.

Then, the coating material was coated on the surface of a 6 μm-thick aramid substrate at a post-drying thickness of 2.0 μm, using a reverse roll. The nonmagnetic substrate with the magnetic coating material coated thereon was oriented in a magnetic field created by a 3,000 G magnet, while the magnetic coating material remained still undried, and then dried. The dried product was calendered through a combination of metal roll—metal roll—metal roll—metal roll—metal roll—metal roll—metal roll at a speed of 100 m/min., a linear pressure of 300 kg/cm and a temperature of 90° C., and then cut to a width of 6.35 mm. In this way, digital video recorder tapes according to Examples 1-1 to 1-5 and Comparative Example 1-1 were prepared.

Examples 1-6 to 1-8 & Comparative Example 1-2

Preparation of the Magnetic Coating Material for the Upper Layer

As in Example 1-1, the polyurethane resins shown in Table 1-3 were used to prepare magnetic coating materials.

Preparation of the Nonmagnetic Coating Material for the Lower Layer

Eighty-five (85) parts of titanium oxide (average grain size: 0.035 μm, crystal rutile; $TiO_2$ content: 90% or more, surface treating layer: alumina, $S_{BET}$: 35–42 m²/g, true specific gravity: 4.1, and pH: 6.5–8.0) were pulverized with 1 part of phenylphosphoric acid in an open kneader for 10 minutes. Then, 5 parts of a vinyl chloride type binder (MR110 made by Nippon Zeon Co., Ltd.), the polyurethane resin shown in Table 3, 10 parts of methyl ethyl ketone, 3 parts of cyclohexanone and 3 parts of toluene were added to and milled with the mixture for 30 minutes. Then, 15 parts of methyl ethyl ketone and 10 parts of methyl isobutyl ketone were added to and milled with the mixture for 60 minutes. Then, the mixture was dispersed for 120 minutes in a sand mill with the addition thereto of the following components:

| Carbon black (with a particle size of 0.1 μm) | 2 parts |
|---|---|
| Methyl ethyl ketone | 200 parts |

The dispersion was stirred and mixed together for a further 20 minutes with the addition thereto of the following components:

| Butyl stearate | 2 parts |
|---|---|
| Stearic acid | 1 part |
| Methyl ethyl ketone | 50 parts |

Thereafter, the mixture was filtered through a filter having an average pore diameter of 1 μm to prepare a nonmagnetic coating material.

Then, the obtained nonmagnetic coating material and the magnetic coating material were almost concurrently coated on A 6 µm-thick aramid substrate in the described order using a reverse roll, the former with a post-drying thickness of 2.0 µm and the latter with a post-drying thickness of 0.1 µm.

The nonmagnetic substrate with the magnetic coating material coated thereon was oriented in a magnetic field created by a 3,000 G magnet, while the magnetic coating material remained still undried, and then dried. The dried product was calendered through a combination of metal roll—metal roll—metal roll—metal roll—metal roll—metal roll—metal roll at a speed of 100 m/min., a linear pressure of 300 kg/cm and a temperature of 90° C., and then cut to a width of 6.35 mm. In this way, digital video recorder tapes according to Examples 1-6 to 1-8 and Comparative Example 1-2 were prepared.

The magnetic tapes obtained in Examples 1-1 to 1-8 and Comparative Examples 1-1 to 1-2 were measured. The results are reported in Tables 1-2 and 1-3.

Measuring Methods (1) Electromagnetic Performance:

Using a drum tester, signals were recorded on a sample tape at a recording wavelength of 0.5 µm and a head speed of 10 m/sec., and then reproduced to measure output upon reproduction. The relative C/N of the tape was estimated relative to the C/N of a reference tape (Comparative Example 1-1) assumed to be 0 dB.

(2) Surface roughness Ra of the Magnetic Layer:

Center-line average surface roughness Ra was measured at a cut-off value of 0.25 mm using a light interference technique using a digital optical profilometer (made by WYKO). This roughness is reported at the column "just after" in the following tables.

(3) Stability upon Dispersion:

The prepared magnetic and nonmagnetic coating materials were let standing at 23° C. for 24 hours, followed by a 10-minute stirring. Then, the coating materials were similarly coated to prepare a magnetic tape. The surface roughness of the magnetic layer was measured as in (2) above. This stability upon dispersion is reported at the column "with time" in the following tables.

(4) Durability: Output Drop, and Contamination of Video Head:

In an environment of 40° C. and 10% RH, a 60-minute tape was continuously run 100 times through a digital video tape recorder (NV-BJ1, Matsushita Electric Industrial Co., Ltd.) to observe contamination of the video head. Video output was estimated on the basis of the output at the first run, assumed to be 0 dB. The criterion of estimation is excellent: no contamination of the head was visually observed at all, and unsatisfactory: contamination of the head was visually observed.

(5) Storability:

After stored for 1 month at 600C and 90% RH, a tape sample was estimated as in (4) above.

TABLE 1-2

| | Polyurethane | C/N | Surface Roughness Ra, nm | |
|---|---|---|---|---|
| | | | Just After | With Time |
| Example | | | | |
| 1-1 | a | 1.6 | 2.1 | 2.2 |
| 1-2 | b | 1.6 | 2.0 | 2.0 |
| 1-3 | c | 1.8 | 2.1 | 2.1 |

TABLE 1-2-continued

| 1-4 | d | 1.4 | 2.2 | 2.3 |
|---|---|---|---|---|
| 1-5 | e | 1.5 | 2.3 | 2.3 |
| Comp. Example | | | | |
| 1-1 | f | 0 | 3.3 | 3.9 |

| | Durability | | Storability | |
|---|---|---|---|---|
| | Contamination of Head | Output Drop (dB) | Contamination of Head | Output Drop (dB) |
| Ex. | | | | |
| 1-1 | Excellent | −0.1 | Excellent | −0.3 |
| 1-2 | Excellent | −0.2 | Excellent | −0.1 |
| 1-3 | Excellent | −0.2 | Excellent | −0.2 |
| 1-4 | Excellent | −0.1 | Excellent | −0.4 |
| 1-5 | Excellent | −0.3 | Excellent | −0.4 |
| Comp. Ex. | | | | |
| 1-1 | Unsatisfactory | −2.2 | Unsatisfactory | −4.9 |

TABLE 1-3

| | Polyurethane | | | Surface Roughness Ra, nm | |
|---|---|---|---|---|---|
| | Upper | Lower | C/N | Just After | With Time |
| Ex. 1-6 | a | a | 2.9 | 1.5 | 1.7 |
| Ex. 1-7 | c | c | 2.5 | 1.5 | 1.6 |
| Ex. 1-8 | e | e | 2.1 | 1.7 | 1.7 |
| Comp. Ex. 1-2 | f | f | 1 | 2.8 | 3.5 |

| | Durability | | Storability | |
|---|---|---|---|---|
| | Contamination of Head | Output Drop (dB) | Contamination of Head | Output Drop (dB) |
| Ex. 1-6 | Excellent | −0.2 | Excellent | −0.5 |
| Ex. 1-7 | Excellent | −0.4 | Excellent | −0.8 |
| Ex. 1-8 | Excellent | −0.7 | Excellent | −1.2 |
| Comp. Ex. 1-2 | Unsatisfactory | −2.5 | Unsatisfactory | −5.8 |

Example 2

Synthesis Of Polyurethane Resin 2-1

In a vessel equipped with a reflux condenser and a stirrer and replaced therein with nitrogen, a diol having such composition as shown in Table 2-1 was dissolved in a 30% solution of cyclohexanone at 60° C. in a nitrogen stream. Then, 60 ppm of a catalyst or dibutyltin dilaurate was added to and dissolved in the solution for a further 15 minutes. Moreover, diisocyanate as shown in Table 2-1 was added to the solution with the application of heat thereto for a six-hour reaction at 90° C., thereby obtaining a polyurethane resin solution 2-1-1.

The weight-average molecular weights, Mw's, of the obtained polyurethane resins are reported in Table 2-1.

TABLE 2-1

| | Diol Component | | | | |
|---|---|---|---|---|---|
| Polyurethane Resin 2-1 | DD | HBpA | NPG | DMH | PES |
| Polyurethane Resin 2-1-1 | 14.9 | 36.2 | 0 | 0 | 0 |
| Polyurethane Resin 2-1-2 | 14.9 | 0 | 15.7 | 0 | 0 |

TABLE 2-1-continued

| | | | | | |
|---|---|---|---|---|---|
| Polyurethane Resin 2-1-3 | 14.9 | 0 | 0 | 24.3 | 0 |
| Polyurethane Resin 2-1-4 | 14.9 | 36.2 | 32 | 0 | 0 |
| Polyurethane Resin 2-1-5 | 0 | 0 | 0 | 0 | 360.7 |

| | Polar Group | Diisocyanate | | |
|---|---|---|---|---|
| Polyurethane Resin 2-1 | DEIS | MDI | TDI | Mw |
| Polyurethane Resin 2-1-1 | 2.2 | 46.7 | 0 | 35,000 |
| Polyurethane Resin 2-1-2 | 2.2 | 46.7 | 0 | 37,000 |
| Polyurethane Resin 2-1-3 | 2.2 | 46.7 | 0 | 38,000 |
| Polyurethane Resin 2-1-4 | 2.2 | 0 | 32.5 | 41,000 |
| Polyurethane Resin 2-1-5 | 2.2 | 46.7 | 0 | 35,000 |

DD: dimer diol
HBpA: hydrogenated bisphenol A
NPG: neopentyl glycol
DMH: dimethylolheptane
PES: polyester polyol (hydrogenated dimer acid/isophthalic acid/neopentyl glycol = 1.8/2.7/5.4 mol, Mw = 2,020)
DEIS: sodium bis(hydroxyethyl)-5-sulfoisophthalate
MDI: diphenylmethane diisocyanate
TDI: tolylene diisocyanate
The figures are given in a part-by-weight unit.

TABLE 2-2

| Polyurethane Resin 2-2 | Short-Chain Diol Component with Cyclic Structure | | Polyol with Ether Group | |
|---|---|---|---|---|
| | HBpA | DEIS | Type | % by weight |
| Polyurethane Resin 2-2-1 | 15 | 2 | Compound A | 50 |
| Polyurethane Resin 2-2-2 | 20 | 2 | Compound B | 45 |
| Polyurethane Resin 2-2-3 | 50 | 2 | Compound A | 10 |
| Polyurethane Resin 2-2-4 | 53 | 2 | Compound A | 10 |
| Polyurethane Resin 2-2-5 | 13 | 2 | Compound A | 50 |
| Polyurethane Resin 2-2-6 | 15 | 2 | Compound A | 55 |
| Polyurethane Resin 2-2-7 | 20 | 2 | Compound B | 50 |
| Polyurethane Resin 2-2-8 | 55 | 2 | Compound B | 6 |

| Polyurethane Resin 2-2 | Diisocyanate MDI | Ether Group in Urethane mmol/g | Mw |
|---|---|---|---|
| Polyurethane Resin 2-2-1 | 33 | 5.4 | 51,300 |
| Polyurethane Resin 2-2-2 | 33 | 5.6 | 50,500 |
| Polyurethane Resin 2-2-3 | 38 | 1.3 | 52,000 |
| Polyurethane Resin 2-2-4 | 40 | 1.2 | 51,500 |
| Polyurethane Resin 2-2-5 | 34 | 5.5 | 52,300 |
| Polyurethane Resin 2-2-6 | 28 | 6.0 | 51,300 |
| Polyurethane Resin 2-2-7 | 28 | 6.3 | 51,000 |
| Polyurethane Resin 2-2-8 | 37 | 0.8 | 53,100 |

HBpA: hydrogenated bisphenol A
DEIS: sodium bis(hydroxyethyl)-5-sulfoisophthalate
MDI: diphenylmethane diisocyanate
The figures are given in a %-by-weight unit.

Example 2-1

Preparation of the Magneti Coating Material for the Upper Layer

One hundred (100) parts of ferromagnetic alloy powders (composition: 89 at % Fe, 5 at % Co and 6 at % Y, Hc: 2,000 Oe, crystallite size: 15 nm, BET specific surface area: 59 m$^2$/g, length: 0.12 μm, aspect ratio: 7, and σs: 150 emu/g) were pulverized in an open kneader for 10 minutes. Then, the powders were milled for 60 minutes with 20 parts (on a solid basis) of polyurethane 2-1-1 shown in Table 2-1 and 60 parts of cyclohexanone. Then, the mixture was dispersed for 120 minutes in a sand mill with the addition thereto of the following components:

| | |
|---|---|
| Abrasive (Al$_2$O$_3$ with a particle size of 0.3 μm) | 2 parts |
| Carbon black (with a particle size of 40 nm) | 2 parts |
| Methyl ethyl ketone/toluene = 1/1 on a weight basis | 200 parts |

The dispersion was stirred and mixed together for a further 20 minutes with the addition thereto of the following components:

| | |
|---|---|
| Polyisocyanate (Colonate 3041 made by Nippon Polyurethane Ltd.) | 5 parts (on a solid basis) |
| Butyl stearate | 2 parts |
| Stearic acid | 1 part |
| Methyl ethyl ketone | 50 parts |

Thereafter, the mixture was filtered through a filter having an average pore diameter of 1 μm to prepare a magnetic coating material for the upper layer.

Preparation of the Nonmagnetic Coating Material for the Lower Layer

Eighty-five (85) parts of α-Fe$_2$O$_3$ (surface-treated to have Al$_2$O$_3$ and SiO$_2$ thereon, and having an average particle size of 0.15 μm, a BET specific surface area of 52 m$^2$/g and a pH value of 6.5 to 8.0) were pulverized in an open kneader for 10 minutes. The powders were then milled with 7.5 parts of a compound obtained by adding sodium hydroxyethyl sulfonate to a copolymer of vinyl chloride/vinyl acetate/glycidyl methacrylate=86/9/5 (SO$_3$Na=6×10$^{-5}$ eq/g, epoxy= 10$^{-3}$ eq/g, and weight-average molecular weight=30,000), 10 parts (on a solid basis) of polyurethane 2-1 shown in Table 2-2 and 60 parts of cyclohexanone for 60 minutes. The mixture was then dispersed for 120 minutes in a sand mill with the addition thereto of 200 parts of methyl ethyl ketone/cyclohexanone =6/4. The dispersion was stirred and mixed together for a further 20 minutes with the addition thereto of the following components:

| | |
|---|---|
| Butyl stearate | 2 parts |
| Stearic acid | 1 part |
| Methyl ethyl ketone | 50 parts |

Thereafter, the mixture was filtered through a filter having an average pore diameter of 1 μm to prepare a coating material for the lower layer.

Then, a sulfonic acid-containing polyester resin was coated by means of a coil bar on the surface of a 10 μm-thick aramid substrate to prepare thereon an adhesive layer of 0.1 μm in thickness, as measured after drying.

Then, the nonmagnetic coating material for the lower layer and the magnetic coating material for the upper layer were almost concurrently coated on the substrate in the described order using a reverse roll, the former with a post-drying thickness of 1.5 µm and the latter with a post-drying thickness of 0.1 µm. The nonmagnetic substrate with the magnetic coating material coated thereon was oriented in a magnetic field created by a 5,000 G Co magnet and a 4,000 G solenoid magnet, while the magnetic coating material remained still undried, and then dried. The dried product was calendered through a combination of metal roll—metal roll—metal roll—metal roll—metal roll—metal roll—metal roll at a speed of 100 m/min., a linear pressure of 300 kg/cm and a temperature of 90° C., and then cut to a width of 3.8 mm to prepare a magnetic tape.

Examples 2-2 to 2-6 & Comparative Example 2-1

Magnetic tapes were prepared following Example 2-1 with the exception that polyurethane 2-1-1 for the upper layer and polyurethane 2-2-1 for the lower layer were changed to the polyurethanes shown in Table 2-3.

Example 2-7 & Comparative Example 2-2

Magnetic tapes were prepared following Example 2-1 and Comparative Example 2-1 with the exception that the α-Fe$_2$O$_3$ (surface-treated to have Al$_2$O$_3$ and SiO$_2$ thereon, and having an average particle size of 0.15 µm, a S$_{BET}$ value of 52 m$^2$/g and a pH value of 6.5 to 8.0) in the coating solution for the lower layer was changed to titanium oxide (crystal rutile having an average particle size of 0.035 µm, a TiO$_2$ content of 90% or more, a surface-treated layer of alumina, an S$_{BET}$ value of 35 to 42 m$^2$/g, a true specific gravity of 4.1 and a pH value of 6.5 to 8.0).

The properties of the magnetic tapes obtained in Examples 2-1 to 2-7 and Comparative Examples 2-1 to 2-2 were measured using the following estimation methods. The results are reported in Table 2-3.

Measuring Methods (1) Coating Smoothness:

A sample was scanned over a 30 µm×30 µm range with a tunnel current 10 nA and a bias current of 400 mv, using a scanning probe microscope, Nanoscope made by Digital Instrument Co., Ltd., thereby finding the number of asperities of 10 nm or more. The obtained value was compared with that of Comparative Example 2-1 assumed to be 10.

(2) Electromagnetic Performance:

Using DDS3 drive (Model C1537, HP Co., Ltd.), a single-frequency signal of 4.7 MHz was recorded at the optimum recording current to measure an output upon reproduction. The output is shown on the basis of that of Comparative Example 2-1 assumed to be 0 dB.

(3) Repetitive Run Durability:

First, a tape sample was stored for 1 week in an environment of 60° C. and 90% RH. In an environment of 40° C. and 80% RH, this sample was then placed under a load of 10 g (T1) while the surface of a magnetic layer thereof was in contact with a guide pole used for the DDS3 drive. Subsequently, tension (T2) was applied on the sample in such a manner that the rate of 8 mm/sec. was obtained. From T2/T1, the coefficient of friction of the magnetic surface with respect to the guide pole was found by the following equation.

Coefficient of friction=1/π·ln(T2/T1)

After measurement, contamination of the guide pole was observed under a differential interference optical microscope, and estimated on the following criterion.

Excellent: no contamination was observed at all.

Good: Uncontaminated spots are much more than contaminated spots.

Unsatisfactory: Contaminated spots are much more than uncontaminated spots.

TABLE 2-3

| | Upper Polyurethane | Lower Polyurethane | Coating Smoothness |
|---|---|---|---|
| Ex. 2-1 | 2-1-1 | 2-2-1 | 117 |
| Ex. 2-2 | 2-1-2 | 2-2-1 | 118 |
| Ex. 2-3 | 2-1-3 | 2-2-1 | 116 |
| Ex. 2-4 | 2-1-4 | 2-2-1 | 120 |
| Ex. 2-5 | 2-1-1 | 2-2-2 | 115 |
| Ex. 2-6 | 2-1-1 | 2-2-3 | 119 |
| Ex. 2-7 | 2-1-1 | 2-2-1 | 118 |
| Comp. Ex. 2-1 | 2-1-5 | 2-2-1 | 100 |
| Comp. Ex. 2-2 | 2-1-5 | 2-2-1 | 102 |

| | Electromagnetic Performance, dB | Repetitive Run Durability |
|---|---|---|
| Ex. 2-1 | 0.7 | Excellent |
| Ex. 2-2 | 0.5 | Excellent |
| Ex. 2-3 | 0.6 | Excellent |
| Ex. 2-4 | 0.7 | Excellent |
| Ex. 2-5 | 0.6 | Excellent |
| Ex. 2-6 | 0.7 | Excellent |
| Ex. 2-7 | 0.7 | Excellent |
| Comp. Ex. 2-1 | 0 | Unsatisfactory |
| Comp. Ex. 2-2 | 0.1 | Unsatisfactory |

Example 3

Synthesis of Synthesis of the Polyurethane Polyol Resin 3-1

In a vessel equipped with a reflux condenser and a stirrer and replaced therein with nitrogen, a diol having such composition as shown in Table 3-1 was dissolved in a 30% solution of cyclohexanone at 60° C. in a nitrogen stream. Then, 60 ppm of a catalyst or dibutyltin dilaurate was added to and dissolved in the solution for a further 15 minutes. Moreover, diisocyanate as shown in Table 3-1 was added to the solution with the application of heat thereto for a six-hour reaction at 90° C., thereby obtaining a polyurethane resin solution 3-1-1.

TABLE 3-1

| | Diol Component | | | | |
|---|---|---|---|---|---|
| Polyurethane Resin 3-1 | DD | HBpA | NPG | DMH | PES |
| Polyurethane Resin 3-1-1 | 14.9 | 36.2 | 0 | 0 | 0 |
| Polyurethane Resin 3-1-2 | 14.9 | 0 | 15.7 | 0 | 0 |
| Polyurethane Resin 3-1-3 | 14.9 | 0 | 0 | 24.3 | 0 |
| Polyurethane Resin 3-1-4 | 14.9 | 36.2 | 0 | 0 | 0 |
| Polyurethane Resin 3-1-5 | 0 | 0 | 0 | 0 | 360.7 |

| | Polar Group | Diisocyanate | | |
|---|---|---|---|---|
| Polyurethane Resin 3-1 | DEIS | MDI | TDI | Mw |
| Polyurethane Resin 3-1-1 | 2.2 | 46.7 | 0 | 35,000 |
| Polyurethane Resin 3-1-2 | 2.2 | 46.7 | 0 | 37,000 |
| Polyurethane Resin 3-1-3 | 2.2 | 46.7 | 0 | 38,000 |

TABLE 3-1-continued

| | | | | |
|---|---|---|---|---|
| Polyurethane Resin 3-1-4 | 2.2 | 0 | 32.5 | 41,000 |
| Polyurethane Resin 3-1-5 | 2.2 | 46.7 | 0 | 35,000 |

DD: dimer diol
HBpA: hydrogenated bisphenol A
NPG: neopentyl glycol
DMH: dimethylolheptane
PES: polyester polyol (hydrogenated dimer acid/isophthalic acid/neopentyl glycol = 1.8/2.7/5.4 mol, Mw = 2,020)
DEIS: sodium bis(hydroxyethyl)-5-sulfoisophthalate
MDI: diphenylmethane diisocyanate
TDI: tolylene diisocyanate
The figures are given in a part-by-weight unit.

Synthesis of the Polyurethane Polyol

For the synthesis of polyester polyols, the dicarboxylic acids and diol components shown in the following Table 3-2 are dehydrated and condensed in conventional manners. The weight-average molecular weights, Mw's, of the obtained polyester polyols are reported in the following Table 3-2.

TABLE 3-2

| Polyester Polyol | Dicarboxylic Acid Type | mol % | Diol Component Type | mole | Mw |
|---|---|---|---|---|---|
| Polyester Polyol A | AD | 100 | 2,2-dimethyl-1,3-propanediol<br>1,3-propanediol | 70<br>30 | 2,100 |
| Polyester Polyol B | AD | 100 | 2,2-dimethyl-1,3-propanediol | 100 | 2,045 |
| Polyester Polyol C | AD | 100 | 2-ethyl-2-butyl-1,3-propanediol<br>1,3-propanediol | 70<br>30 | 2,050 |
| Polyester Polyol D | IPH | 100 | 2-ethyl-2-butyl-1,3-propanediol<br>1,3-propanediol | 70<br>30 | 2,200 |
| Polyester Polyol E | IPH<br>SIPH | 70<br>30 | 2,2-dimethyl-1,3-propanediol<br>1,3-propanediol | 70<br>30 | 2,150 |

AD: Adipic Acid
IPH: Isophthalic Acid
SIPH: Sulfoisophthalic Acid

Synthesis of Polyurethane Resin 3-2

Polyurethane resins 3-2 were prepared using the polyester polyols shown in Table 3-2 and the materials shown in the following Table 3-3 in the same manner as was the case with polyurethane 1-1. The weight-average molecular weights, Mw's, of the obtained polyurethane resins 3-2 are reported in the following Table 3-3.

TABLE 3-3

| Polyurethane Resin 3-2 | Polyol Type | Mole | Chain Extender Type | Mole |
|---|---|---|---|---|
| Polyurethane Resin 3-2-1 | polyester polyol A<br>polyester polyol E | 6<br>3 | 2-ethyl-2-butyl-1,3 propanediol | 100 |
| Polyurethane Resin 3-2-2 | polyester polyol B<br>polyester polyol E | 6<br>3 | 2-ethyl-2-butyl-1,3 propanediol | 100 |
| Polyurethane Resin 3-2-3 | polyester polyol C<br>polyester polyol E | 6<br>3 | 2-ethyl-2-butyl-1,3 propanediol | 100 |
| Polyurethane Resin 3-2-4 | polyester polyol D<br>polyester polyol E | 6<br>3 | 2-ethyl-2-butyl-1,3 propanediol | 100 |
| Polyurethane Resin 3-2-5 | polyester polyol A<br>polyester polyol E | 6<br>3 | 1,3-propanediol | 100 |
| Polyurethane Resin 3-2-6 | polyester polyol A<br>polyester polyol E | 6<br>3 | 1,9-nonanediol | 100 |

TABLE 3-3-continued

| Polyurethane Resin 3-2 | Diisocyanate MDI | Concentration of Urethane mmol/g | Mw |
|---|---|---|---|
| Polyurethane 3-2-1 | 107 | 3.5 | 51,000 |
| Polyurethane 3-2-2 | 107 | 3.5 | 49,500 |
| Polyurethane 3-2-3 | 107 | 3.3 | 55,000 |
| Polyurethane 3-2-4 | 107 | 3.5 | 51,000 |
| Polyurethane 3-2-5 | 107 | 3.7 | 51,500 |
| Polyurethane 3-2-6 | 107 | 3.4 | 53,000 |

MDI: Diphenylmethane Diisocyanate

Example 3-1

Preparation of the Magnetic Coating Material for the Upper Layer

One hundred (100) parts of ferromagnetic alloy powders (composition: 89 at % Fe, 5 at % Co and 6 at % Y, Hc: 2,000 Oe, crystallite size: 15 nm, BET specific surface area: 59 m²/g, length: 0.12 μm, aspect ratio: 7, and σs: 150 emu/g) were pulverized in an open kneader for 10 minutes. Then, the powders were milled for 60 minutes with 20 parts (on a solid basis) of polyurethane 3-1-1 shown in Table 3-1 and 60 parts of cyclohexanone. Then, the mixture was dispersed for 120 minutes in a sand mill with the addition thereto of the following components:

| | |
|---|---|
| Abrasive (alumina with a particle size of 0.3 μm) | 2 parts |
| Carbon black (with a particle size of 40 nm) | 2 parts |
| Methyl ethyl ketone/toluene = 1/1 on a weight basis | 200 parts |

The dispersion was stirred and mixed together for a further 20 minutes with the addition thereto of the following components:

| | |
|---|---|
| Polyisocyanate (Colonate 3041 made by Nippon Polyurethane Co., Ltd.) | 5 parts (on a solid basis) |
| Butyl stearate | 2 parts |
| Stearic acid | 1 part |
| Methyl ethyl ketone | 50 parts |

Thereafter, the mixture was filtered through a filter having an average pore diameter of 1 μm to prepare a magnetic coating material for the upper layer.

Preparation of the Nonmagnetic Coating Material for the Lower Layer

Eighty-five (85) parts of α-Fe$_2$O$_3$ (surface-treated to have Al$_2$O$_3$ and SiO$_2$ thereon, and having an average particle size of 0.15 μm, a BET specific surface area of 52 m²/g and a pH value of 6.5 to 8.0) were pulverized in an open kneader for 10 minutes. The powders were then milled with 7.5 parts of a compound obtained by adding sodium hydroxyethyl sulfonate to a copolymer of vinyl chloride/vinyl acetate/glycidyl methacrylate=86/9/5 (SO$_3$Na=6×10$^{-5}$ eq/g, epoxy= 10$^{-3}$ eq/g, and weight-average molecular weight=30,000), 10 parts (on a solid basis) of polyurethane 3-2-1 shown in Table 3 and 60 parts of cyclohexanone for 60 minutes. The mixture was then dispersed for 120 minutes in a sand mill with the addition thereto of 200 parts of methyl ethyl ketone/cyclohexanone=6/4. The dispersion was stirred and mixed together for a further 20 minutes with the addition thereto of the following components:

| Butyl stearate | 2 parts |
| --- | --- |
| Stearic acid | 1 part |
| Methyl ethyl ketone | 50 parts |

Thereafter, the mixture was filtered through a filter having an average pore diameter of 1 µm to prepare a coating material for the lower layer.

Then, a sulfonic acid-containing polyester resin was coated by means of a coil bar on the surface of a 10 µm-thick aramid substrate to prepare thereon an adhesive layer of 0.1 µm in thickness, as measured after drying.

Then, the nonmagnetic coating material for the lower layer and the magnetic coating material for the upper layer were almost concurrently coated on the substrate in the described order using a reverse roll, the former with a post-drying thickness of 1.5 µm and the latter with a post-drying thickness of 0.1 µm. The nonmagnetic substrate with the magnetic coating material coated thereon was oriented in a magnetic field created by a 5,000 G Co magnet and a 4,000 G solenoid magnet, while the magnetic coating material remained still undried, and then dried. The dried product was calendered through a combination of metal roll—metal roll—metal roll—metal roll—metal roll—metal roll—metal roll at a speed of 100 m/min., a linear pressure of 300 kg/cm and a temperature of 90° C., and then cut to a width of 3.8 mm to prepare a magnetic tape.

Examples 3-2 to 3-6 & Comparative Example 3-1

Magnetic tapes were prepared following Example 3-1 with the exception that polyurethane 3-1-1 for the upper layer and polyurethane 3-2-1 for the lower layer were changed to the polyurethanes shown in Table 3-4.

Example 3-7 & Comparative Example 3-2

Magnetic tapes were prepared following Example 3-1 and Comparative Example 3-1 with the exception that the α-Fe$_2$O$_3$ (surface-treated to have Al$_2$O$_3$ and SiO$_2$ thereon, and having an average particle size of 0.15 µm, a S$_{BET}$ value of 52 m$^2$/g and a pH value of 6.5 to 8.0) in the nonmagnetic coating material for the lower layer was changed to titanium oxide (crystal rutile having an average particle size of 0.035 µm, a TiO$_2$ content of 90% or more, a surface-treated layer of Al$_2$O$_3$, an S$_{BET}$ value of 35 to 42 m$^2$/g, a true specific gravity of 4.1 and a pH value of 6.5 to 8.0).

The properties of the magnetic tapes obtained in Examples 3-1 to 3-7 and Comparative Examples 3-1 to 3-2 were measured using the following estimation methods. The results are reported in Table 3-4.

Measuring Methods (1) Coating Smoothness:

A sample was scanned over a 30 µm×30 µm range with a tunnel current 10 nA and a bias current of 400 mV, using a scanning probe microscope, Nanoscope made by Digital Instrument Co., Ltd., thereby finding the number of asperities of 10 nm or more. The obtained value was compared with that of Comparative Example 3-1 assumed to be 10.

(2) Electromagnetic Performance:

Using DDS3 drive (Model C1537, HP Co., Ltd.), a single-frequency signal of 4.7 MHz was recorded at the optimum recording current to measure an output upon reproduction. The output is shown on the basis of that of Comparative Example 2-1 assumed to be 0 dB.

(3) Repetitive Run Durability:

First, a tape sample was stored for 1 week in an environment of 60° C. and 90% RH. In an environment of 40° C. and 80% RH, this sample was then placed under a load of 10 g (T1) while the surface of a magnetic layer thereof was in contact with a guide pole used for the DDS3 drive. Subsequently, tension (T2) was applied on the sample in such a manner that the rate of 8 mm/sec. was obtained. From T2/T1, the coefficient of friction of the magnetic surface with respect to the guide pole was found by the following equation.

$$\text{Coefficient of friction} = 1/\pi \cdot \ln(T2/T1)$$

For measurement, the sample was repeatedly run until 500 passes, and the coefficient of friction of the sample was measured at the first pass, and the 500th pass.

After measurement, contamination of the guide pole was observed under a differential interference optical microscope, and estimated on the following criterion.

Excellent: no contamination was observed at all.

Good: Uncontaminated spots are much more than contaminated spots.

Unsatisfactory: Contaminated spots are much more than uncontaminated spots.

TABLE 3-4

| | Upper Polyurethane | Lower Polyurethane | Coating Smoothness |
| --- | --- | --- | --- |
| Ex. 3-1 | 3-1-1 | 3-2-1 | 120 |
| Ex. 3-2 | 3-1-2 | 3-2-1 | 118 |
| Ex. 3-3 | 3-1-3 | 3-2-1 | 118 |
| Ex. 3-4 | 3-1-4 | 3-2-1 | 120 |
| Ex. 3-5 | 3-1-1 | 3-2-2 | 115 |
| Ex. 3-6 | 3-1-1 | 3-2-3 | 119 |
| Ex. 3-7 | 3-1-1 | 3-2-1 | 121 |
| Comp. Ex. 3-1 | 3-1-5 | 3-2-1 | 100 |
| Comp. Ex. 3-2 | 3-1-5 | 3-2-1 | 102 |

| | Electromagnetic Performance, dB | Repetitive Run Durability |
| --- | --- | --- |
| Ex. 3-1 | 0.7 | Excellent |
| Ex. 3-2 | 0.5 | Excellent |
| Ex. 3-3 | 0.6 | Excellent |
| Ex. 3-4 | 0.7 | Excellent |
| Ex. 3-5 | 0.6 | Excellent |
| Ex. 3-6 | 0.7 | Excellent |
| Ex. 3-7 | 0.7 | Excellent |
| Comp. Ex. 3-1 | 0 | Unsatisfactory |
| Comp. Ex. 3-2 | 0.1 | Unsatisfactory |

Example 4

Synthesis of the Polyurethane Resin

The starting materials shown in Table 4-1 were charged in a mixed solvent of cyclohexanone and toluene at 1:1 in the amounts shown in Table 1-1 for polymerization by a one-shot process. In Table 4-1 are also shown the glass transition temperatures and weight-average molecular weights (Mw's) of the obtained polyurethane polymers.

TABLE 4-1

| Polyurethane Resin | Diol Component | | | | | | Polar Group |
| --- | --- | --- | --- | --- | --- | --- | --- |
| | DD | EEPr | EBPr | HBPA | NPG | PES | DEIS |
| Polyurethane a | 139.4 | 26.4 | 0 | 0 | 0 | 0 | 4 |
| Polyurethane b | 53.6 | 47.52 | 0 | 0 | 0 | 0 | 4 |
| Polyurethane c | 26.8 | 54.12 | 0 | 0 | 0 | 0 | 4 |
| Polyurethane d | 139.4 | 0 | 32 | 0 | 0 | 0 | 4 |
| Polyurethane e | 39.2 | 0 | 0 | 95.6 | 0 | 0 | 4 |
| Polyurethane f | 0 | 0 | 0 | 0 | 10.4 | 727.2 | 12 |

| Polyurethane Resin | Diisocyanate MDI | Tg (° C.) | Mw | Urethane Group $10^{-3}$ eq/g | $SO_3M$ $10^{-5}$ eq/g |
| --- | --- | --- | --- | --- | --- |
| Polyurethane a | 123 | 86 | 35,000 | 3.4 | 6.0 |
| Polyurethane b | 123 | 135 | 41,000 | 4.3 | 7.6 |
| Polyurethane c | 123 | 178 | 36,000 | 4.7 | 8.4 |
| Polyurethane d | 123 | 67 | 42,000 | 3.3 | 5.8 |
| Polyurethane e | 123 | 165 | 54,000 | 3.7 | 8.3 |
| Polyurethane f | 123 | 36 | 45,000 | 1.1 | 5.7 |

DD: dimer diol
EEPr: 2,2-diethyl-1,3-propanediol
EBPr: 2-ethyl-2-butyl-1,3-propanediol
HBPA: hydrogenated bisphenol A
NPG: neopentyl glycol
PES: polyester polyol (hydrogenated dimer acid/isophthalic acid/1,6-hexanediol = 1.8/2.7/5.4 mol, Mw = 2,020)
DEIS: sodium bis(hydroxyethyl)-5-sulfoisophthalate
MDI: diphenylmethane diisocyanate
The figures are given in a part-by-weight unit.

Examples 4-1 to 4-10 & Comparative Example 4-1 TO 4-2

Preparation of the Magnetic Coating Material for the Upper Layer

One hundred (100) parts of ferromagnetic alloy powders (composition: 92% Fe, 4% Zn and 4% Ni, Hc: 2,000 Oe, crystallite size: 15 nm, BET specific surface area: 59 m²/g, length: 0.12 μm, aspect ratio: 7, and σs: 140 emu/g) were pulverized in an open kneader for 10 minutes. Then, the powders were mixed and milled for 30 minutes with 1 part of phenylphorphoric acid, 10 parts by methyl ethyl ketone, 3 parts of cyclohexanone and 3 parts of toluene. Then, 5 parts of a vinyl chloride type binder (MR110 made by Nippon Zeon Co., Ltd.), 5 parts of the polyurethane resin shown in Table 4-2, 15 parts of methyl ethyl ketone and 10 parts of methyl isobutyl ketone were added to and milled with the mixture for 60 minutes. Then, the mixture was dispersed for 120 minutes in a sand mill with the addition thereto of the following components:

| Abrasive ($Al_2O_3$ with a particle size of 0.3 μm) | 2 parts |
| --- | --- |
| Carbon black (with a particle size of 0.1 μm) | 2 parts |
| Methyl ethyl ketone/toluene | 250 parts |

The dispersion was stirred and mixed together for a further 20 minutes with the addition thereto of the following components:

| Polyisocyanate (Colonate 3041 made by Nippon Polyurethane Co., Ltd.) | 5 parts (on a solid basis) |
| --- | --- |
| Lubricant of Table 4-3 | 2 parts |
| Stearic acid | 1 part |
| Methyl ethyl ketone | 50 parts |

Thereafter, the mixture was filtered through a filter having an average pore diameter of 1 μm to prepare a magnetic coating material. Then, the obtained magnetic coating material was coated on the surface of a 6 μm-thick aramid substrate at a post-drying thickness of 2.0 μM, using a reverse roll. The nonmagnetic substrate with the magnetic coating material coated thereon was oriented in a magnetic field created by a 3,000 G magnet, while the magnetic coating material remained still undried, and then dried. The dried product was calendered through a combination of metal roll—metal roll—metal roll—metal roll—metal roll—metal roll—metal roll at a speed of 100 m/min., a linear pressure of 300 kg/cm and a temperature of 90° C., and then slit to a width of 6.35 mm. In this way, digital video recorder tapes according to Examples 4-1 to 4-10 and Comparative Example 4-1 to 4-2 were prepared.

Example 4-11 to 4-14 & Comparative Example 4-3

Preparation of the Magnetic Coating Material for the Upper Layer

As in Example 4-1, the materials shown in Table 4-3 were used to prepare magnetic coating materials.

Preparation of the Nonmagnetic Coating Material for the Lower Layer

Eighty-five (85) parts of titanium oxide (average grain size: 0.035 μm, crystal rutile; $TiO_2$ content: 90% or more, surface treating layer: alumina, $S_{BET}$: 35-42 m²/g, true specific gravity: 4.1, and pH: 6.5–8.0) were pulverized with 1 part of phenylphosphoric acid in an open kneader for 10 minutes. Then, 5 parts of a vinyl chloride type binder (MR110 made by Nippon Zeon Co., Ltd.), the polyurethane resin of Table 4-1, 10 parts of methyl ethyl ketone, 3 parts of cyclohexanone and 3 parts of toluene were added to and milled with the mixture for 30 minutes. Then, 15 parts of methyl ethyl ketone and 10 parts of methyl isobutyl ketone were added to and milled with the mixture for 60 minutes. Then, the mixture was dispersed for 120 minutes in a sand mill with the addition thereto of the following components:

| Carbon black (with a particle size of 40 nm) | 2 parts |
| --- | --- |
| Methyl ethyl ketone | 200 parts |

The dispersion was stirred and mixed together for a further 20 minutes with the addition thereto of the following components:

| Lubricant of Table 4-2 | 2 parts |
| --- | --- |
| Stearic acid | 1 part |
| Methyl ethyl ketone | 50 parts |

Thereafter, the mixture was filtered through a filter having an average pore diameter of 1 μm to prepare a nonmagnetic coating material.

Then, the obtained nonmagnetic coating material and the magnetic coating material were almost concurrently coated on the surface of a 6 μm-thick aramid substrate in the described order using a reverse roll, the former with a post-drying thickness of 1.0 μm and the latter with a post-drying thickness of 0.1 μm.

The nonmagnetic substrate with the magnetic coating material coated thereon was oriented in a magnetic field created by a 3,000 G magnet, while the magnetic coating material remained still undried, and then dried. The dried product was calendered through a combination of metal roll—metal roll—metal roll—metal roll—metal roll—metal roll—metal roll at a speed of 100 m/min., a linear pressure of 300 kg/cm and a temperature of 90° C., and then cut to a width of 6.35 mm. In this way, digital video recorder tapes according to Examples 4-11 to 4-14 and Comparative Example 4-3 were prepared.

The properties of the obtained magnetic tapes were measured. The results are reported in Tables 42 and 4-3.

Measuring Methods
(1) Electromagnetic Performance:

Using a drum tester, signals were recorded on a sample tape at a recording wavelength of 0.5 μm and a head speed of 10 m/sec., and then reproduced to measure output upon reproduction. Relative output is shown on the basis of the output of Comparative Example 4-1 assumed to be 0 dB.

(2) Surface Roughness Ra:

Center-line average surface roughness Ra was measured at a cut-off value of 0.25 mm using a light interference technique with a digital optical profilometer (made by WYKO).

(3) Durability:

a) Still durability was estimated by a period of time to a 50% output drop in a still state in a digital video tape recorder (NV-BJ1, Matsushita Electric Industrial Co., Ltd.) maintained in a 40° C. and 80% RH environment.

b) Coefficient of Friction

In an environment of 40° C. and 10% RH, a 60-minute tape was continuously run 100 times through a digital video tape recorder (NV-BJ1, Matsushita Electric Industrial Co., Ltd.). The coefficients of friction of the magnetic layer in the tape before and after tape run were found in an environment of 23° C. and 50% RH.

TABLE 4-2

| | Polyurethane of Table 4-1 | Lubricant | | C/N |
|---|---|---|---|---|
| Ex. 4-1 | a | neopentyl glycol dioleate | | 2.3 |
| Ex. 4-2 | b | neopentyl glycol dioleate | | 2.4 |
| Ex. 4-3 | c | neopentyl glycol dioleate | | 2.2 |
| Ex. 4-4 | d | neopentyl glycol dioleate | | 2.2 |
| Ex. 4-5 | e | neopentyl glycol dioleate | | 2.3 |
| Ex. 4-6 | e | neopentyl glycol dimyristate | | 2.4 |
| Ex. 4-7 | e | neopentyl glycol dioleate | | 2.3 |
| Ex. 4-8 | e | neopentyl glycol dilaurate | | 2.4 |
| Ex. 4-9 | e | neopentyl glycol didecanoate | | 2.4 |
| Ex. 4-10 | e | neopentyl glycol dioctanoate | | 2.3 |
| Comp. Ex. 4-1 | f | neopentyl glycol dioleate | | 0.2 |
| Comp. Ex. 4-2 | f | butyl stearate | | 0 |

| | Surface Roughness, Ra | | Run Durability | | |
|---|---|---|---|---|---|
| | | | Still, min. | Coef. of Friction | |
| | Just After | With Time | | Before | After |
| Ex. 4-1 | 1.9 | 1.9 | ≧120 | 0.29 | 0.32 |
| Ex. 4-2 | 1.8 | 2.1 | ≧120 | 0.28 | 0.31 |
| Ex. 4-3 | 1.8 | 2.1 | ≧120 | 0.3 | 0.31 |
| Ex. 4-4 | 1.9 | 2 | ≧120 | 0.3 | 0.31 |

TABLE 4-2-continued

| Ex. 4-5 | 2.1 | 2.1 | ≧120 | 0.29 | 0.32 |
|---|---|---|---|---|---|
| Ex. 4-6 | 1.9 | 2.1 | ≧120 | 0.29 | 0.31 |
| Ex. 4-7 | 1.8 | 2.2 | ≧120 | 0.28 | 0.31 |
| Ex. 4-8 | 1.9 | 2 | ≧120 | 0.29 | 0.3 |
| Ex. 4-9 | 1.9 | 2.2 | ≧120 | 0.29 | 0.31 |
| Ex. 4-10 | 1.9 | 2.1 | ≧120 | 0.29 | 0.31 |
| Comp. Ex. 4-1 | 3.8 | 6.5 | 20 | 0.35 | 0.43 |
| Comp. Ex. 4-2 | 4.1 | 6.7 | 5 | 0.38 | 0.59 |

TABLE 4-3

| | Polyurethane of Table 4-1 Upper Lower | Lubricant Upper Lower | C/N |
|---|---|---|---|
| Ex. 4-11 | a<br>a | neopentyl glycol dioleate<br>neopentyl glycol dioleate | 3.1 |
| Ex. 4-12 | c<br>c | ethylene glycol dioleate<br>ethylene glycol dioleate | 2.9 |
| Ex. 4-13 | e<br>e | neopentyl glycol dilaurate<br>neopentyl glycol dilaurate | 2.8 |
| Comp. Ex. 4-3 | f<br>f | butyl stearate<br>butyl stearate | 1 |

| | Surface Roughness, Ra | | Run Durability | | |
|---|---|---|---|---|---|
| | | | Still, min. | Coef. of Friction | |
| | Just After | With Time | | Before | After |
| Ex. 4-11 | 1.4 | 1.7 | ≧120 | 0.28 | 0.3 |
| Ex. 4-12 | 1.4 | 1.6 | ≧120 | 0.28 | 0.31 |
| Ex. 4-13 | 1.6 | 1.7 | ≧120 | 0.3 | 0.31 |
| Comp. Ex. 4-3 | 2.8 | 3.5 | 5 | 0.39 | 0.64 |

Applicability of the Invention to Industrial Use

One advantage of the binder used for the magnetic recording medium of the present invention and comprising specific polyurethane resins is that when the magnetic material is dispersed with the binder in a solvent, the binder adsorbed onto the magnetic material is likely to have such a structure or conformation as to extend its molecular chain largely. Consequently, it is possible to improve the electromagnetic performance of the magnetic recording medium due to improved dispersibility.

Unlike the commonly used polyester polyurethane (polyurethane obtained by polymerization of polyester polyol with diisocyanate) and polyether polyurethane (urethane obtained by polymerization of polyether polyol with diisocyanate), the polyurethane resin of the present invention has basically neither ester bonds nor ether bonds. This implies that the polyurethane resin is less susceptible to deterioration and decomposition in a high temperature and humidity environment, so that the long-term storability of the magnetic recording medium can be much more improved. In particular, the prior art polyurethane using polyester polyol offers a grave problem in conjunction with hydrolysis of ester bond moieties and thermal decomposition of ether bonds in polyether urethane. By use of the polyurethane according to the present invention, however, this problem can be substantially solved.

With the prior art polyurethane designed to increase and improve the whole hydrophobicity and resistance to hydrolysis of polymer by using hydrogenated dimer acid for the acid component of polyester polyol, this problem cannot essentially be solved because it is a polyester type urethane containing ester bonds. In particular, this is an important problem with a recent magnetic recording medium using a fine grain form of metal magnetic material, because the surface catalytic activity of the magnetic material is high and accordingly the decomposition reaction of the binder is accelerated. With the polyurethane of the present invention, this problem, too, can of course be solved.

What we claim is:

1. A magnetic recording medium comprising a substrate and a magnetic layer stacked thereon and comprising a dispersion of a ferromagnetic powder in a binder, wherein said binder contains a polyurethane resin 1 obtained by polymerization of a diol compound having a cyclic structure and having an alkyl group having from 2 to 18 carbon atoms attached thereto, with a diisocyanate.

2. The magnetic recording medium according to claim 1, which has between said substrate and said magnetic layer a lower layer comprising a dispersion of at least one of an inorganic powder and a magnetic powder in a binder, wherein the binder in said lower layer optionally contains polyurethane resin 1.

3. The magnetic recording medium according to claim 1 or 2, wherein said polyurethane resin 1 is a polyurethane resin containing as diol components a dimer diol having a cyclic structure and an alkyl group having from 2 to 18 carbon atoms, and an aliphatic diol having an alkyl branched chain of from 2 to 18 carbon atoms.

4. The magnetic recording medium according to claim 3, wherein said polyurethane resin contains $1\times10^{-6}$ to $2\times10^{-4}$ eq/g of at least one polar group selected from the group consisting of —$SO_3M$, —$SO_4M$, —COOM, —$PO_3M_2$, —$PO_4M_2$, a sulfobetaine group, a phosphobetaine group, a sulfamic acid group and a sulfamic acid salt group.

5. The magnetic recording medium according to claim 1, wherein said diol compound is at least one diol compound selected from the group consisting of compounds represented by formulae 1 and 2:

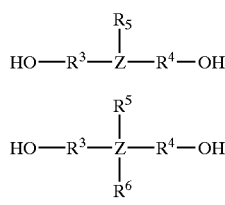

Formula 1

Formula 2 wherein:

Z is selected from the group consisting of a benzene ring, a naphthalene ring and a cyclohexane ring, $R^3$ and $R^4$ are each an alkylene group having 1 to 18 carbon atoms, and $R^5$ and $R^6$ are each an alkyl group having 2 to 18 carbon atoms.

6. The magnetic recording medium according to claim 2, which further contains the polyurethane resin 1 in said binder of said magnetic layer and a polyurethane resin 2 comprising a polyether polyol having a cyclic structure in said binder of said lower layer.

7. The magnetic recording medium according to claim 6, wherein said diol compound is at least one diol compound selected from the group consisting of compounds represented by the following formulae 3 to 6:

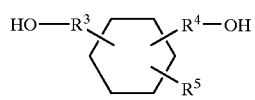

Formula 3

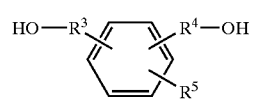

Formula 4

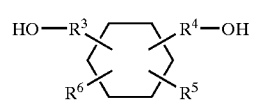

Formula 5

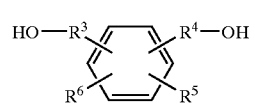

Formula 6 wherein $R^3$ and $R^4$ are each an alkylene group having 1 to 18 carbon atoms, and $R^5$ and $R^6$ are each an alkyl group having 2 to 18 carbon atoms.

8. The magnetic recording medium according to claim 6, wherein said diol compound is a dimer diol represented by formula 7:

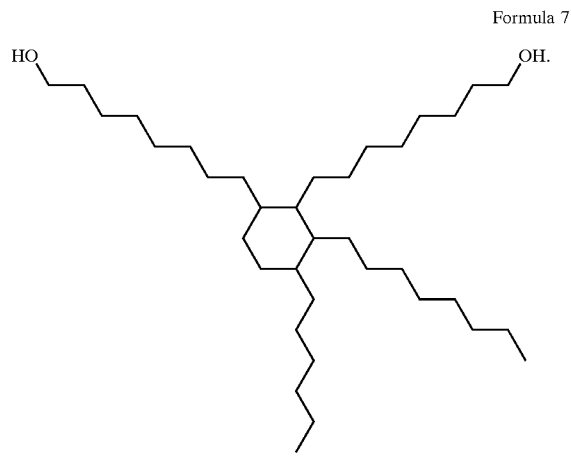

Formula 7

9. The magnetic recording medium according to claim 6, wherein said polyurethane resin 2 is a polyurethane resin obtained by polymerizing (i) 10 to 50% by weight of a polyol containing 1 to 6 mmol/g of an ether group in polyurethane, (ii) 15 to 50% by weight of a chain extender comprising a diol having a cyclic structure and (iii) an organic diisocyanate.

10. The magnetic recording medium according to claim 6, wherein said magnetic layer contains polyurethane resin 1 as the binder and said lower layer contains polyurethane resin 2 as the binder.

11. The magnetic recording medium according to claim 2, wherein said binder in said magnetic layer includes polyurethane 1 and said binder in said lower layer includes a polyurethane 3 obtained by polymerization of a polyester polyol, a chain extender and a diisocyanate compound, said polyester polyol including as a dibasic acid an aliphatic dibasic acid and as a diol component an aliphatic diol free from a cyclic structure having an alkyl branched side chain and said chain extender including as a chain extender an aliphatic diol having an alkyl branched side chain.

12. The magnetic recording medium according to claim 11, wherein said diol compound is at least one diol compound selected from the group consisting of compounds represented by formula 1 and 2:

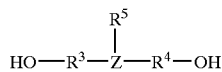
Formula 1

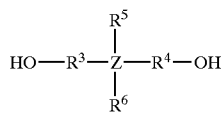
Formula 2 wherein:

Z is selected from the group consisting of a benzene ring, a naphthalene ring and a cyclohexane ring, $R^3$ and $R^4$ are each an alkylene group having 1 to 18 carbon atoms, and $R^5$ and $R^6$ are each an alkyl group having 2 to 18 carbon atoms.

13. The magnetic recording medium according to claim 11, wherein said diol compound is at least one diol compound selected from the group consisting of compounds represented by formulae 3 to 6:

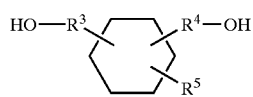
Formula 3

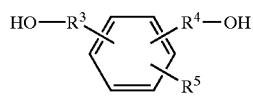
Formula 4

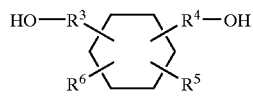
Formula 5

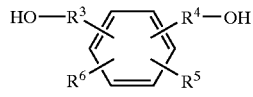
Formula 6 wherein $R^3$ and $R^4$ are each an alkylene group having 1 to 18 carbon atoms, and $R^5$ and $R^6$ are each an alkyl group having 2 to 18 carbon atoms.

14. The magnetic recording medium according to claim 11, wherein said diol compound is a dimer diol represented by formula 7:

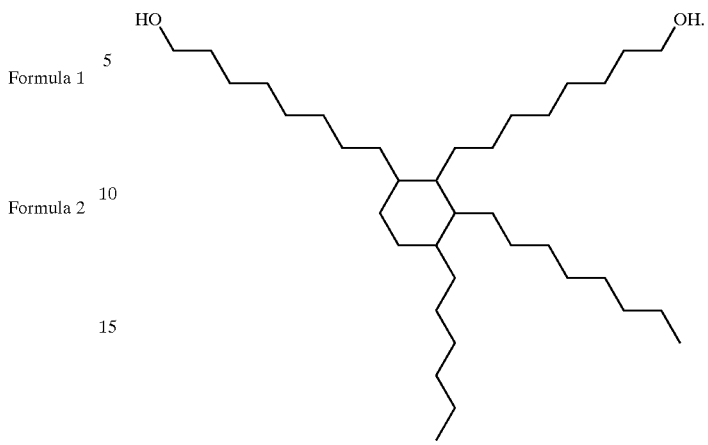
Formula 7

15. The magnetic recording medium according to claim 11, wherein said magnetic layer includes polyurethane resin as the binder and said lower layer includes polyurethane resin 3 as the binder.

16. The magnetic recording medium according to claim 11, wherein said polyurethane resin 1 is obtained by polymerizing at least 10% by weight of a dimer diol having a cyclic structure and having an alkyl group having from 2 to 18 carbon atoms attached thereto.

17. The magnetic recording medium according to claim 11, wherein said polyurethane resin 3 has an urethane group concentration of 2.5 to 4.5 mmol/g in polyurethane.

18. A magnetic recording medium comprising a nonmagnetic substrate and a magnetic layer stacked thereon and comprising a dispersion of a ferromagnetic powder in a binder, wherein said binder includes a polyurethane resin 1 obtained by polymerization of a diol compound having a cyclic structure and an alkyl group having from 2 to 18 carbon atoms, with a diisocyanate compound and said magnetic layer includes a diester compound selected from the group consisting of compounds represented by formula 8 and formula 9:

$$R^{11}-X-R^{22}$$ Formula 8

$$R^{33}-Y-R^{44}$$ Formula 9 wherein:

$R^{11}$ and $R^{22}$ are each a fatty acid residue having 5 to 21 carbon atoms, $R^{33}$ and R44 are each a divalent alcohol group having 5 to 21 carbon atoms, X is a divalent alcohol residue having 2 to 10 carbon atoms, and Y is a dicarboxylic acid residue having 3 to 10 carbon atoms.

19. The magnetic recording medium according to claim 18, wherein said polyurethane resin 1 is a polyurethane resin free from a polyester polyol having a molecular weight of 800 or greater.

20. The magnetic recording medium according to claim 18, wherein said polyurethane resin 1 is a polyurethane resin containing $1\times10^{-6}$ eq/g to $2\times10^{-4}$ eq/g of at least one polar group selected from $-SO_3M$, $-SO_4M$, $-COOM$, $-PO_3M_2$ and $-PO_4M_2$.

21. The magnetic recording medium according to claim 18, wherein said diol compound is at least one diol compound selected from the group consisting of compounds represented by formulae 1 and 2:

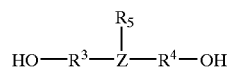

Formula 1

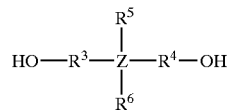

Formula 2 wherein:

Z is selected from the group consisting of a benzene ring, a naphthalene ring and a cyclohexane ring, $R^3$ and $R^4$ are each an alkylene group having 1 to 18 carbon atoms, and $R^5$ and $R^6$ are each an alkyl group having 2 to 18 carbon atoms.

22. The magnetic recording medium according to claim 18, wherein said diol compound is at least one diol compound selected from the group consisting of compounds represented by the following formulae 3 to 6:

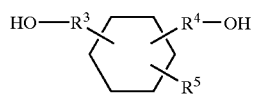

Formula 3

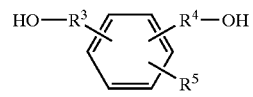

Formula 4

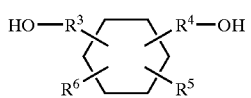

Formula 5

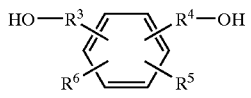

Formula 6 wherein $R^3$ and $R^4$ are each an alkylene group having 1 to 18 carbon atoms, and $R^5$ and $R^6$ are each an alkyl group having 2 to 18 carbon atoms.

23. The magnetic recording medium according to claim 18, wherein said diol compound is a dimer diol represented by formula 7:

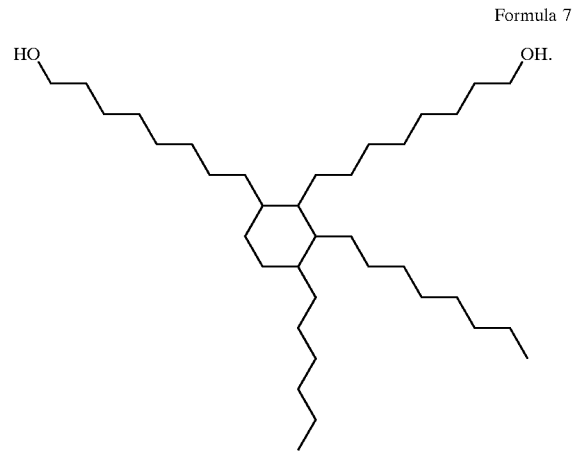

Formula 7

* * * * *